(12) United States Patent
Nagaoka et al.

(10) Patent No.: US 11,513,306 B2
(45) Date of Patent: *Nov. 29, 2022

(54) CAMERA ACCESSORY MOUNT

(71) Applicant: NIKON CORPORATION, Tokyo (JP)

(72) Inventors: Koji Nagaoka, Yokohama (JP);
Noriyasu Kotani, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 148 days.

This patent is subject to a terminal disclaimer.

(21) Appl. No.: 16/170,159

(22) Filed: Oct. 25, 2018

(65) Prior Publication Data

US 2019/0129126 A1    May 2, 2019

(30) Foreign Application Priority Data

Oct. 26, 2017 (JP) .............................. JP2017-206880

(51) Int. Cl.
*G02B 7/02* (2021.01)
*G03B 17/14* (2021.01)
(Continued)

(52) U.S. Cl.
CPC .............. *G02B 7/022* (2013.01); *G02B 7/14* (2013.01); *G03B 17/14* (2013.01); *G03B 3/10* (2013.01); *H04N 5/2253* (2013.01)

(58) Field of Classification Search
CPC .......... G02B 7/14; G02B 7/022; G03B 17/14; G03B 3/10; G03B 3/12; H04N 5/2253; H04N 5/2254

See application file for complete search history.

(56) References Cited

U.S. PATENT DOCUMENTS 4,637,704 A  *  1/1987  Ishimura ................ G03B 17/14
                                                              396/301
4,954,092 A      9/1990  Fransson et al.
(Continued)

FOREIGN PATENT DOCUMENTS

DE    10 2006 019449 A1    10/2007
EP          2 725 417 A1     4/2014
(Continued)

OTHER PUBLICATIONS

U.S. Appl. No. 16/170,142, filed Oct. 25, 2018 in the name of Nagaoka et al.
(Continued)

*Primary Examiner* — Alicia M Harrington
(74) *Attorney, Agent, or Firm* — Oliff PLC

(57) ABSTRACT

An interchangeable lens is removably attached to a camera body including a body-side mount, an image sensor, body-side terminals and a first to fourth body-side claws. The interchangeable lens includes the lens-side mount, lens-side terminals which are in contact with body-side terminals, a first to fourth lens-side claws engaged with the first to fourth body-side claws once the interchangeable lens is attached to the camera body. The first and third lens-side claws are disposed on a third lens-side line intersecting with the first lens-side line at an optical axis with approximately 45 degrees. The first lens-side line passes through a center between opposite ends of the first lens-side claw to the optical axis. The second and fourth lens-side claws are disposed on a fourth lens-side line orthogonal to the third lens-side line at the optical axis.

21 Claims, 15 Drawing Sheets

(51) Int. Cl.
*G02B 7/14* (2021.01)
*G03B 3/10* (2021.01)
*H04N 5/225* (2006.01)

(56) References Cited

U.S. PATENT DOCUMENTS

| | | | |
|---|---|---|---|
| 9,310,669 B2* | 4/2016 | Iikawa | G03B 17/14 |
| 2007/0166028 A1 | 7/2007 | Kranz et al. | |
| 2008/0304818 A1 | 12/2008 | Kranz et al. | |
| 2011/0176035 A1 | 7/2011 | Poulsen | |
| 2012/0057860 A1 | 3/2012 | Hasuda et al. | |
| 2012/0195587 A1 | 8/2012 | Hasuda et al. | |
| 2014/0119720 A1 | 5/2014 | Iikawa et al. | |
| 2014/0193145 A1 | 7/2014 | Hasuda et al. | |
| 2016/0041453 A1 | 2/2016 | Pizzo et al. | |

FOREIGN PATENT DOCUMENTS

| | | |
|---|---|---|
| EP | 2 728 405 A1 | 5/2014 |
| JP | S52-21036 A | 2/1977 |
| JP | H1-169882 A | 7/1989 |
| JP | H08-43910 A | 2/1996 |
| JP | 2000-047308 A | 2/2000 |
| JP | 2000-89332 A | 3/2000 |
| JP | 2004-102005 A | 4/2004 |
| JP | 2007-193332 A | 8/2007 |
| JP | 2010-044203 A | 2/2010 |
| JP | 2012-058708 A | 3/2012 |
| JP | 2012-078772 A | 4/2012 |
| JP | 2012-078783 A | 4/2012 |
| JP | 2012-155290 A | 8/2012 |
| JP | 2012-194586 A | 10/2012 |
| JP | 2013-003389 A | 1/2013 |
| JP | 2013-003390 A | 1/2013 |
| JP | 2013-003391 A | 1/2013 |
| JP | 2013-080210 A | 5/2013 |
| JP | 2014-157248 A | 8/2014 |
| WO | 2013/38973 A1 | 3/2013 |

OTHER PUBLICATIONS

U.S. Appl. No. 16/170,076, filed Oct. 25, 2018 in the name of Nagaoka et al.
Nov. 20, 2018 Office Action issued in JP Patent Application No. 2017-206880.
Nov. 20, 2018 Office Action issued in JP Patent Application No. 2017-206881.
Nov. 20, 2018 Office Action issued in JP Patent Application No. 2017-206882.
Mar. 18, 2019 Extended Search Report issued in European Patent Application No. 18202576.7.
Mar. 18, 2019 Extended Search Report issued in European Patent Application No. 18202574.2.
Mar. 22, 2019 Extended Search Report issued in European Patent Application No. 18202573.4.
Westlake, Andrew. "Leica T (Typ 701) First Impressions Review". Digital Photography Review, Apr. 24, 2014, 8 pages, https://www.dpreview.com/reviews/leica-t-typ701/3.
Waller, Joshua. "Leica T (Typ 701) System Full Review". ePHOTOzine, May 13, 2014, 14 pages, https://www.ephotozine.com/article/leica-t-typ-701-system-full-review-24575.
Jul. 9, 2019 Office Action issued in Japanese Patent Application No. 2017-206881.
Apr. 2, 2019 Office Action issued in JP Patent Application No. 2017-206880.
Apr. 2, 2019 Office Action issued in JP Patent Application No. 2017-206881.
Suzuki, Makoto, "Leica's First Fullsizemirales Leica SL". Digital Watch, Japan Impress Corporation, Oct. 21, 2015, 20 pages, https://dc.watch.impress.co.jp/docs/news/726618.html.
Nov. 10, 2020 Office Action issued in U.S. Appl. No. 16/170,076.
Nov. 12, 2020 Office Action issued in U.S. Appl. No. 16/170,142.
Sep. 7, 2021 Office Action issued in Japanese Patent Application No. 2019-144444.
Nov. 2, 2021 Office Action issued in European Patent Application No. 18 202 573.4.
Nov. 2, 2021 Office Action issued in European Patent Application No. 18 202 574.2.
Nov. 2, 2021 Office Action issued in European Patent Application No. 18 202 576.7.
"Camera Lens Mount Chart by I/BE Optics", Film and Digital Times, edited and published by Jon Fauer, Film and Digital Times, Inc., U.S.A., issue 81-82, Apr.-Jun. 2017.
Feb. 24, 2022 Office Action issued in Indian Patent Application No. 201814040388.
Mar. 16, 2022 Office Action issued in Indian Patent Application No. 2011814040387.
Mar. 8, 2022 Office Action issued in Indian Patent Application No. 201814040390.

* cited by examiner

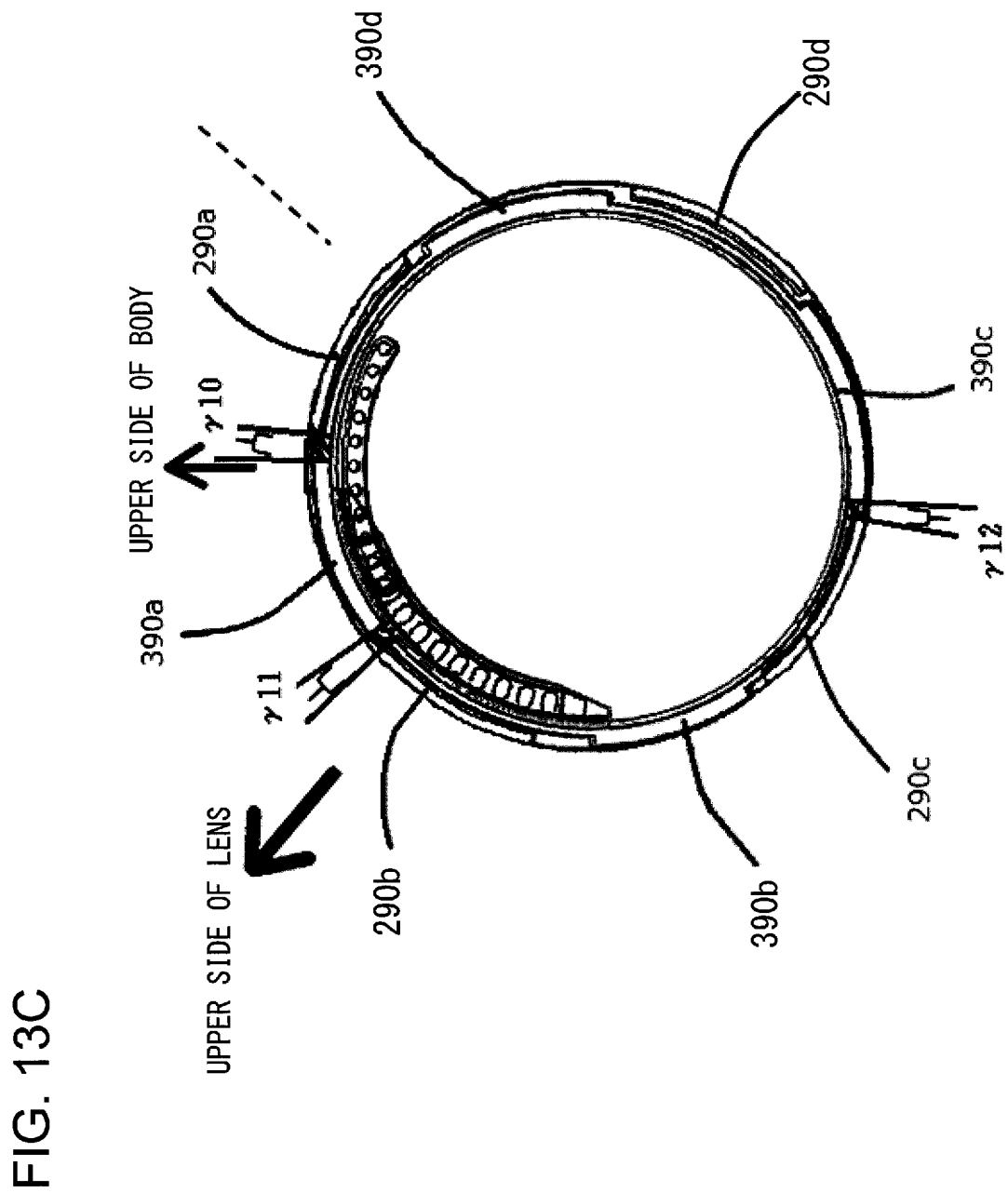

CAMERA ACCESSORY MOUNT

INCORPORATION BY REFERENCE

The disclosure(s) of the following priority application(s) is herein incorporated by reference: Japanese Patent Application No. 2017-206880 filed Oct. 26, 2017.

TECHNICAL FIELD

The present invention relates to an accessory.

BACKGROUND ART

An accessory which can be removably attached to a camera body is known (for example, PTL1). Conventionally, it has been necessary to attach an accessory to a camera body properly in a usable manner.

CITATION LIST

Patent Literature

PTL1: Japanese Patent Laid-Open No. 8-43910

SUMMARY OF INVENTION (1) In an accessory according to a first aspect of the present invention, the accessory is removably attached to a camera body. The camera body includes; an image sensor which has a rectangular shape having an upper side, a lower side, a right side and a left side in a case where the camera body is horizontally held, the image sensor receiving incident subject light centering around an optical axis, body-side terminal group including a plurality of body-side terminals disposed above the upper side of the image sensor, a body-side mount disposed outside the image sensor and the body-side terminal group, the body-side mount being ring-shaped centering around the optical axis, and a plurality of body-side projecting portions projecting from the body-side mount in an inner diameter direction, wherein, the plurality of body-side projecting portions are respectively disposed in four regions divided by a first body-side line which passes through a center in a circumferential direction of the body-side terminal group and the optical axis, and a second body-side line which is orthogonal to the first body-side line at the optical axis. The accessory comprises: an accessory-side mount being ring-shaped centering around the optical axis and being to be in contact with the body-side mount; a cylindrical portion extending in the optical axis direction from an inner peripheral edge portion of the accessory-side mount; accessory-side terminal group disposed inside the cylindrical portion, the accessory-side terminal group including a plurality of accessory-side terminals to be in contact with the body-side terminals upon attachment to the camera body; a first accessory-side projecting portion projecting from the cylindrical portion in an outer periphery direction of the accessory-side mount and extending in a circumferential direction around the optical axis; a second accessory-side projecting portion projecting from the cylindrical portion in the outer periphery direction of the accessory-side mount and extending in the circumferential direction around the optical axis; a third accessory-side projecting portion projecting from the cylindrical portion in the outer periphery direction of the accessory-side mount and extending in the circumferential direction around the optical axis; and a fourth accessory-side projecting portion projecting from the cylindrical portion in the outer periphery direction of the accessory-side mount and extending in the circumferential direction around the optical axis, wherein: the first accessory-side projecting portion and the third accessory-side projecting portion are disposed on a third accessory-side line intersecting with a first accessory-side line which passes through a central portion between terminals each arranged at opposite ends of the accessory-side terminal group and the optical axis, at the optical axis at approximately 45 degrees, and the second accessory-side projecting portion and the fourth accessory-side projecting portion are disposed on a fourth accessory-side line orthogonal to the third accessory-side line at the optical axis.

(2) In an accessory according to a second aspect of the present invention, the accessory is removably attached to a camera body. The camera body includes an image sensor which has a rectangular shape having an upper side and a lower side in a case where the camera body is horizontally held and receives incident subject light centering around an optical axis, body-side terminal group including a plurality of body-side terminals disposed in an arc shape above the upper side of the image sensor, and a ring-shaped body-side mount disposed outside the image sensor and the body-side terminal group and centering around the optical axis. The accessory comprises: an accessory-side mount being ring-shaped centering around the optical axis, and being to be in contact with the body-side mount; a cylindrical portion extending in the optical axis direction from an inner peripheral edge portion of the accessory-side mount; accessory-side terminal group disposed inside the cylindrical portion and including a plurality of accessory-side terminals which come into contact with the body-side terminals upon attachment to the camera body; a first accessory-side projecting portion projecting from the cylindrical portion in an outer periphery direction of the accessory-side mount and extending in a circumferential direction around the optical axis; a second accessory-side projecting portion projecting from the cylindrical portion in the outer periphery direction of the accessory-side mount and extending in the circumferential direction around the optical axis; a third accessory-side projecting portion projecting from the cylindrical portion in the outer periphery direction of the accessory-side mount and extending in the circumferential direction around the optical axis; and a fourth accessory-side projecting portion extending from the cylindrical portion in the outer periphery direction of the accessory-side mount and extending in the circumferential direction around the optical axis, wherein: the first accessory-side projecting portion and the third accessory-side projecting portion are disposed on a third accessory-side line intersecting with a first accessory-side line which passes through a center of the accessory-side terminal group and the optical axis, at the optical axis at approximately 45 degrees, and the third accessory-side projecting portion and the fourth accessory-side projecting portion are disposed on a fourth accessory-side line orthogonal to the second accessory-side line at the optical axis.

(3) In an accessory according to a third aspect of the present invention, the accessory is removably attached to a camera body. The camera body includes a body mount and body-side terminals. The accessory comprises; an accessory-side mount being ring-shaped centering around the optical axis and being to be in contact with the body-side mount; a cylindrical portion extending in the optical axis direction from an inner peripheral edge portion of the accessory-side mount; accessory-side terminal group disposed inside the cylindrical portion, the accessory-side terminal group including a plurality of accessory-side terminals to be in contact with the body-side terminals upon attachment to the camera body; a first accessory-side projecting portion projecting from the cylindrical portion in an outer periphery direction of the accessory-side mount and extending in a circumferential direction around the optical axis; a second accessory-side projecting portion projecting from the cylindrical portion in the outer periphery direction of the accessory-side mount and extending in the circumferential direction around the optical axis; a third accessory-side projecting portion projecting from the cylindrical portion in the outer periphery direction of the accessory-side mount and extending in the circumferential direction around the optical axis; and a fourth accessory-side projecting portion projecting from the cylindrical portion in the outer periphery direction of the accessory-side mount and extending in the circumferential direction around the optical axis, wherein: the first accessory-side projecting portion and the third accessory-side projecting portion are disposed on a third accessory-side line intersecting with a first accessory-side line which passes through a central portion between terminals each arranged at opposite ends of the accessory-side terminal group and the optical axis, at the optical axis at approximately 45 degrees, and the second accessory-side projecting portion and the fourth accessory-side projecting portion are disposed on a fourth accessory-side line orthogonal to the third accessory-side line at the optical axis.

BRIEF DESCRIPTION OF DRAWINGS

FIGS. 13A, 13B and 13C are front views of the body-side claw portion and the lens-side claw portion in a second erroneous insertion state, a third erroneous insertion state and a fourth erroneous insertion state, as seen from the interchangeable lens side.

DESCRIPTION OF EMBODIMENTS

Figure 1:
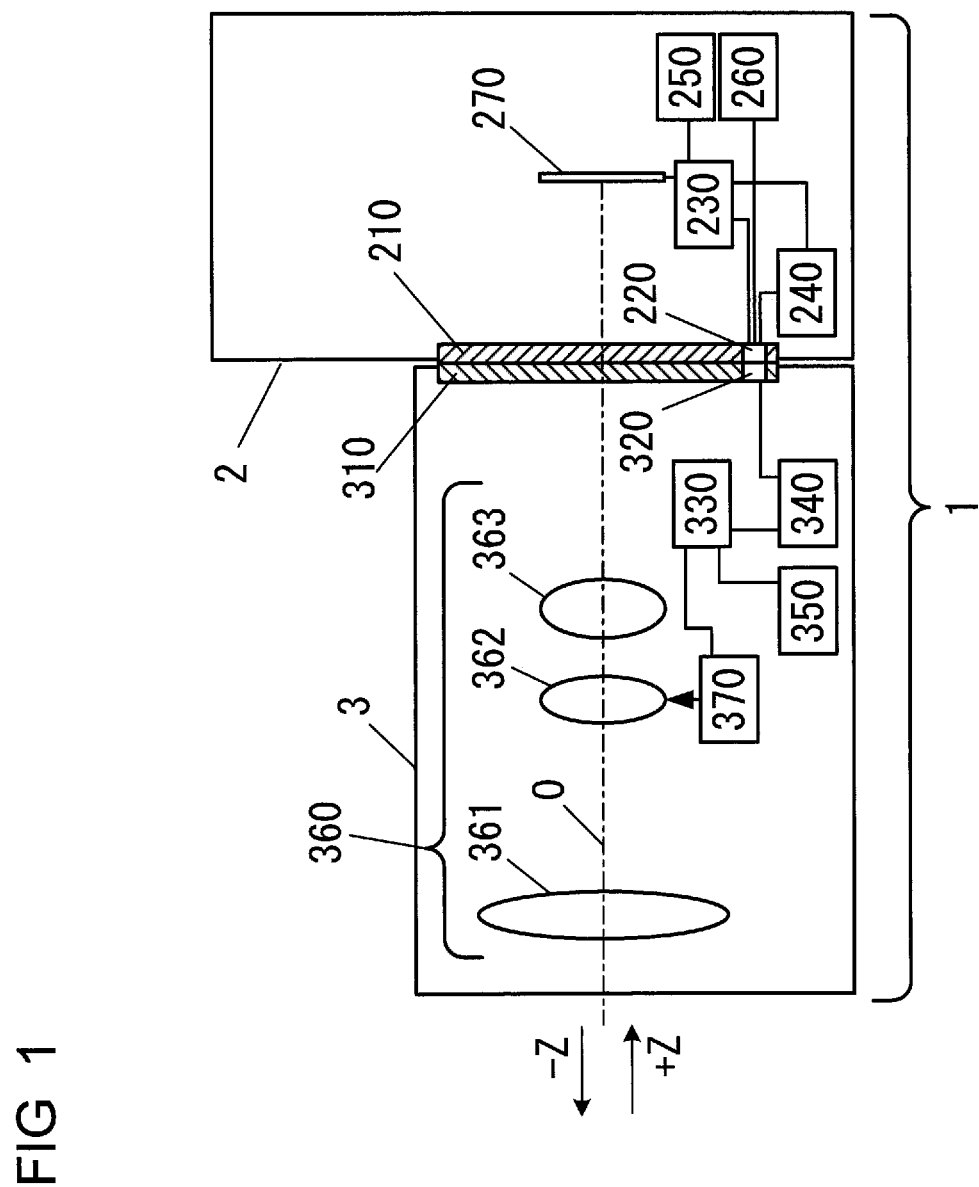
FIG. 1 is a cross-sectional view schematically illustrating a configuration of a camera system.

FIG. 1 is a cross-sectional view illustrating outline of a configuration of a camera system 1 according to an embodiment of the invention. The camera system 1 includes a camera body 2, and an interchangeable lens 3 as one example of an accessory which can be removably attached to the camera body 2. Other examples of the accessory which can be removably attached to the camera body 2 can include a mount adapter, a tele converter, a wide converter, or the like.

The interchangeable lens 3 includes a lens-side mount 310, a lens-side terminal holding unit 320, a lens-side CPU 330, a lens-side communication unit 340, a lens-side storage unit 350, an imaging optical system 360 and a driving unit 370. The lens-side mount 310 and the lens-side terminal holding unit 320 will be described in detail later.

The lens-side CPU 330 is configured with a microcomputer, its peripheral circuits, or the like. The lens-side communication unit 340 performs predetermined data communication with the camera body 2. The lens-side communication unit 340 is connected to lens-side terminals (which will be described later) provided at the lens-side terminal holding unit 320, and the lens-side CPU 330. The lens-side storage unit 350 is a non-volatile storage medium. The lens-side storage unit 350 is connected to the lens-side CPU 330. In the lens-side storage unit 350, a predetermined control program, or the like, to be executed by the lens-side CPU 330 is stored in advance. The lens-side CPU 330 controls the interchangeable lens 3 by loading the control program from the lens-side storage unit 350 and executing the program.

The imaging optical system 360 causes a subject image to be formed on an imaging surface of an image sensor 270 which will be described later. An optical axis O of the imaging optical system 360 coincides with central positions of the lens-side mount 310 and a body-side mount 210 which will be described later. The imaging optical system 360 in FIG. 1 schematically includes a lens 361, a focusing lens 362 and a lens 363. The focusing lens 362 is a lens for adjusting a position where the subject image is formed. The driving unit 370 is connected to the lens-side CPU 330, and includes an actuator, or the like, which is not illustrated. The driving unit 370 moves the focusing lens 362 back and forth in a direction of the optical axis O (+Z or −Z direction) by this actuator, or the like.

The camera body 2 includes the body-side mount 210, a body-side terminal holding unit 220, a body-side CPU 230, a body-side communication unit 240, a body-side storage unit 250, a power supplying unit 260 and the image sensor 270. The body-side mount 210 and the body-side terminal holding unit 220 will be described in detail later.

The body-side CPU 230 is configured with a microcomputer, its peripheral circuits, or the like. Note that the body-side CPU 230 performs various kinds of control on the camera body. The body-side communication unit 240 performs predetermined data communication with the interchangeable lens 3. The body-side communication unit 240 is connected to a plurality of body-side terminals (which will be described later) provided at the body-side terminal holding unit 220, and the body-side CPU 230.

The body-side storage unit 250 is a non-volatile storage medium. The body-side storage unit 250 is connected to the body-side CPU 230. In the body-side storage unit 250, a predetermined control program, or the like, to be executed by the body-side CPU 230 is stored in advance. The body-side CPU 230 controls the camera body 2 by loading the control program from the body-side storage unit 250 and executing the program.

The power supplying unit 260 includes a power supply, and supplies power to device inside of the camera body 2 and the interchangeable lens 3. The power supplying unit 260 is connected to the body-side terminals (which will be described later) provided at the body-side terminal holding unit 220 and the body-side CPU 230. The image sensor 270 is, for example, a solid image sensor such as a CCD and a CMOS. The image sensor 270 is connected to the body-side CPU 230, captures a subject and outputs an imaging signal. Explanation regarding processing on the imaging signal outputted will be omitted.

Explanation of Lens Mount Mechanism

The camera system 1 of the present embodiment includes a so-called bayonet lens mount mechanism. The body-side mount 210 provided at the camera body 2 and the lens-side mount 310 provided at the interchangeable lens 3 will be explained below in order.

Body-Side Mount 210

Figure 2:
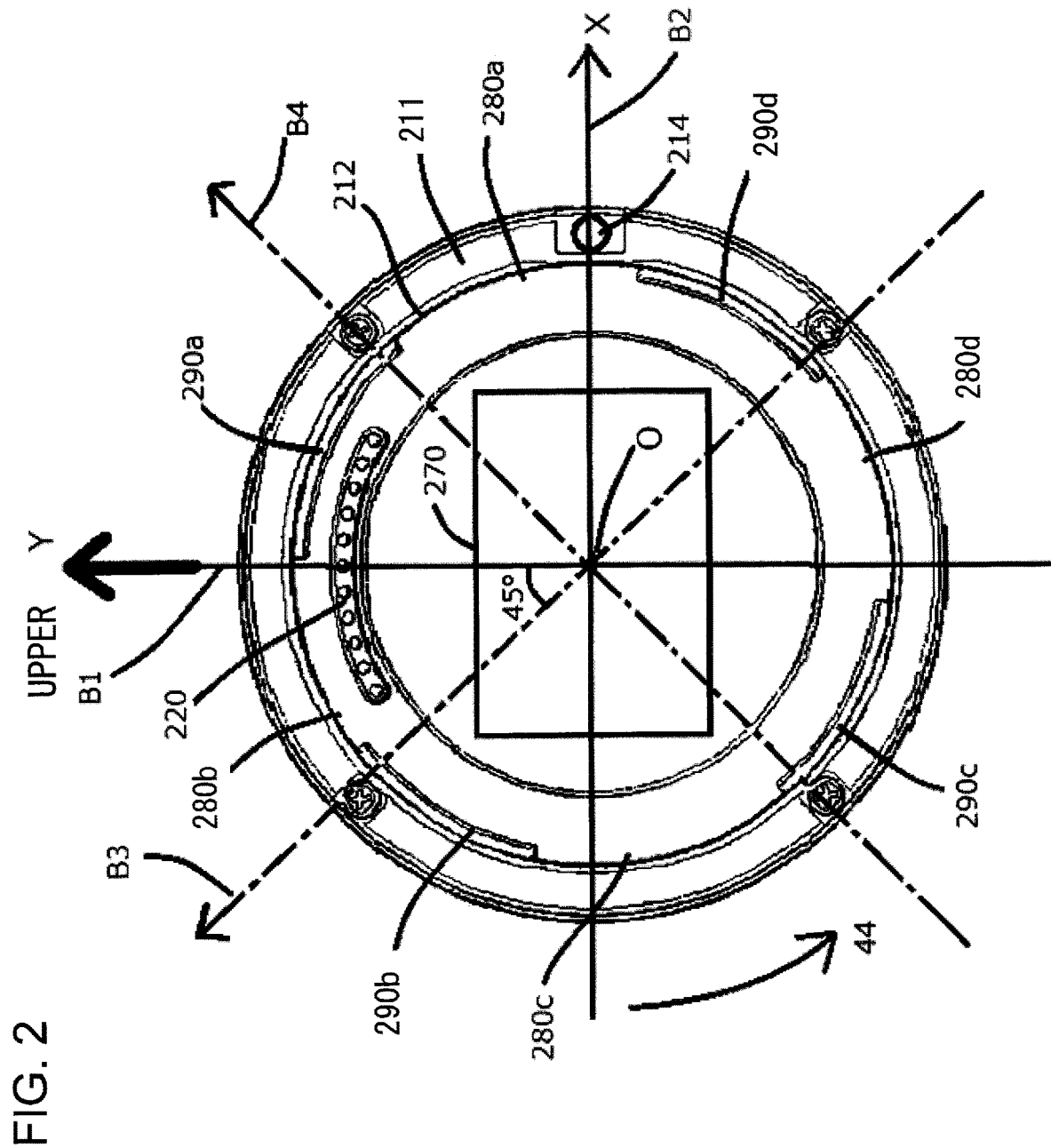
FIG. 2 is a front view of a mount surface of a camera body, as seen from an interchangeable lens side.
Figure 3:
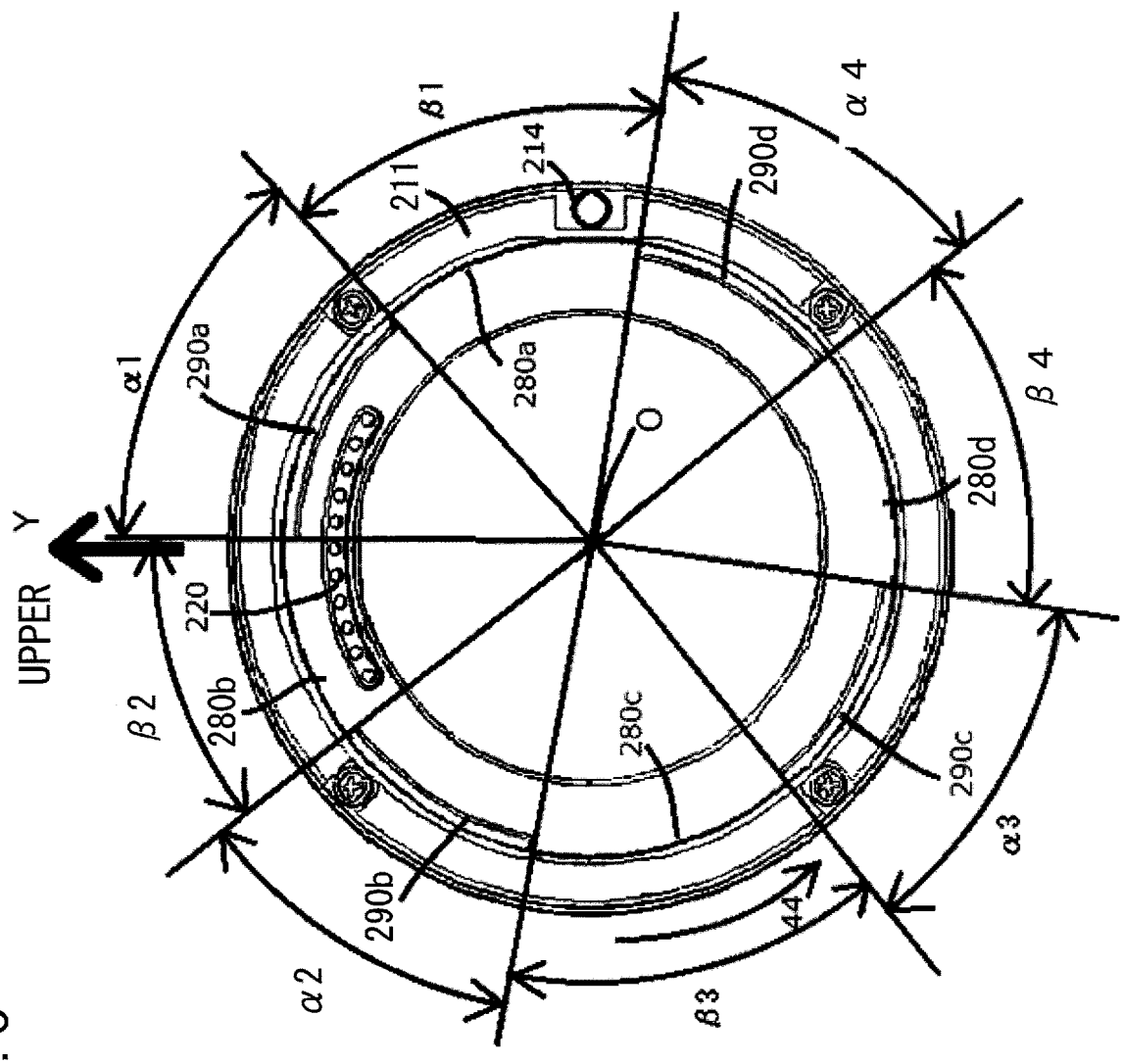
FIG. 3 is a front view of the mount surface of the camera body, as seen from the interchangeable lens side.

FIG. 2 and FIG. 3 are diagrams schematically illustrating a mount of the camera body 2, as seen from the interchangeable lens 3 side. Referring number 44 is shown as a rotating direction of the interchangeable lens 3 when the interchangeable lens 3 is attached to the camera body 2. The rotating direction or attaching direction 44 is a direction seen from the interchangeable lens 3. FIG. 2 and FIG. 3 illustrate the camera body 2 being held in a laterally holding or in a horizontally holding. As illustrated in FIG. 2, in the case where the camera body 2 is horizontally held in the laterally holding, a rectangular image sensor 270 is placed so that the longitudinal direction of the image sensor 270 extends in a horizontal or lateral direction, that is, so that long sides become an upper side and a lower side, and short sides become a right side and a left side.

A first body-side line B1 extending in a vertical direction Y of the camera body 2, indicated with a solid line in FIG. 2 is in a vertical direction seen from a photographer who laterally holds the camera body 2 in the laterally holding using the camera system 1. A second body-side line B2 extending in a horizontal direction X of the camera body 2, indicated with a solid line in FIG. 2 is in a horizontal direction seen from the photographer who laterally holds the camera body 2 in the laterally holding using the camera system 1.

Note that direction X is a horizontal direction or lateral direction and direction Y is a vertical direction or longitudinal direction.

The first body-side line B1 is orthogonal to the second body-side line B2 on the optical axis O (center). Lines B3 and B4 indicated with a dashed-dotted line in FIG. 2 extend in directions intersecting with the first body-side line B1 and the second body-side line B2 on the optical axis O of the image sensor 270 at 45 degrees. These Lines B3 and B4 are referred to as a third body-side line B3 and a fourth body-side line B4.

The mount of the camera body 2 comprises the body-side mount 210 and the body-side terminal holding unit 220 mentioned above in FIG. 1. The body-side mount 210 includes a ring-shaped reference surface 211 which has a fixed width and which is disposed along a surface orthogonal to the optical axis O. Further, the body-side mount 210 includes a first body-side claw portion 290a, a second body-side claw portion 290b, a third body-side claw portion 290c and a fourth body-side claw portion 290d.

In the following description, these four first body-side claw portion 290a to fourth body-side claw portion 290d which are projecting portions will be collectively referred to as a body-side claw portion 290.

The body-side claw portions 290 are disposed along a circular opening 212 of the body-side mount 210 at intervals. As illustrated in FIG. 2, the first body-side claw portion 290a, the second body-side claw portion 290b, the third body-side claw portion 290c and the fourth body-side claw portion 290d are respectively disposed at an upper right position, at an upper left position, at a lower left position and at a lower right position. The first body-side claw portion 290a is disposed in a region above the second body-side line B2 and on a right side of the first body-side line B1, the second body-side claw portion 290b is disposed in a region above the second body-side line B2 and on a left side of the first body-side line B1, the third body-side claw portion 290c is disposed in a region below the second body-side line B2 and on a left side of the first body-side line B1, and the fourth body-side claw portion 290d is disposed in a region below the second body-side line B2 and on a right side of the first body-side line B1.

The first body-side claw portion 290a and the third body-side claw portion 290c are respectively disposed in regions which are on the fourth body-side line B4 and which are substantially symmetric about the optical axis O. The second body-side claw portion 290b and the fourth body-side claw portion 290d are respectively disposed in regions which are on the third body-side line B3 and which are substantially symmetric about the optical axis O.

Note that, as illustrated in FIG. 2, each of central positions or areas of the first body-side claw portion 290a to the fourth body-side claw portion 290d in relation to respective circumferential directions overlaps with neither the third body-side line B3 nor the fourth body-side line B4.

As illustrated in FIG. 3, lengths of the circumferential directions of the first body-side claw portion 290a to the fourth body-side claw portion 290d are different from each other. Specifically, the length of the first body-side claw portion 290a is the longest, the length of the third body-side claw portion 290c is the second longest, the length of the fourth body-side claw portion 290d is the third longest, and the length of the second body-side claw portion 290b is the shortest.

An angle $\alpha 1$ formed by a line connecting one end of the first body-side claw portion 290a and the optical axis O and a line connecting the other end of the first body-side claw portion 290a and the optical axis O is approximately 47 degrees, and is between 46.5 degrees and 47.5 degrees.

An angle $\alpha 3$ formed by a line connecting one end of the third body-side claw portion 290c and the optical axis O and a line connecting the other end of the third body-side claw portion 290c and the optical axis O is approximately 42.5 degrees, and is between 42.0 degrees and 43.0 degrees.

An angle $\alpha 4$ formed by a line connecting one end of the fourth body-side claw portion 290d and the optical axis O and a line connecting the other end of the fourth body-side claw portion 290d and the optical axis O is approximately 42 degrees, and is between 41.5 degrees and 42.5 degrees.

An angle $\alpha 2$ formed by a line connecting one end of the second body-side claw portion 290b and the optical axis O and a line connecting the other end of the second body-side claw portion 290b and the optical axis O is approximately 40 degrees, and is between 40.0 degrees and 41.0 degrees.

Lengths of the first body-side claw portion 290a to the fourth body-side claw portion 290d in a radial direction (heights of the claw portions) are the same. Further, lengths of the first body-side claw portion 290a to the fourth body-side claw portion 290d in the optical axis O direction (thicknesses of the claw portions) are the same.

The body-side claw portion 290 projects toward the optical axis O (center of the image sensor 270) from the opening 212 of the body-side mount 210. There are a portion where the body-side claw portion 290 exists and a portion where the body-side claw portion 290 does not exist on a circumference of the opening 212. In the following explanation, space 280a between the first body-side claw portion 290a and the fourth body-side claw portion 290d on the circumference of the opening 212 of the body-side mount 210 will be referred to as a first body-side through portion 280a.

Note that a through portion is also called as an attaching/removing portion where each end of the lens-side claw portions 290a-290d pass through in attaching operation and removing operation.

In a similar manner, space 280b between the first body-side claw portion 290a and the second body-side claw portion 290b will be referred to as a second body-side through portion 280b, space 280c between the second body-side claw portion 290b and the third body-side claw portion 290c will be referred to as a third body-side through portion 280c, and space 280d between the third body-side claw portion 290c and the fourth body-side claw portion 290d will be referred to as a fourth body-side through portion 280d. These first body-side through portion 280a to fourth body-side through portion 280d which are four spaces will be collectively referred to as a body-side through portion 280.

Lengths of the first body-side through portion 280a to the fourth body-side through portion 280d in the circumferential direction are different from each other. Specifically, the third body-side through portion 280c is the longest, the first body-side through portion 280a is the second longest, the fourth body-side through portion 280d is the third longest, and the second body-side through portion 280b is the shortest.

An angle β3 formed by a line connecting one end of the third body-side through portion 280c and the optical axis O and a line connecting the other end of the third body-side through portion 280c and the optical axis O is approximately 51 degrees, and is between 51.0 degrees and 52.0 degrees.

An angle β1 formed by a line connecting one end of the first body-side through portion 280a and the optical axis O and a line connecting the other end of the first body-side through portion 280a and the optical axis O is approximately 50 degrees, and is between 50.0 degrees and 51.0 degrees.

An angle β4 formed by a line connecting one end of the fourth body-side through portion 280d and the optical axis O and a line connecting the other end of the fourth body-side through portion 280d and the optical axis O is approximately 46 degrees, and is between 45.5 degrees and 46.5 degrees.

An angle β2 formed by a line connecting one end of the second body-side through portion 280b and the optical axis O and a line connecting the other end of the second body-side through portion 280b and the optical axis O is approximately 39 degrees, and is between 39.0 degrees and 40.0 degrees.

Of course, a sum of the angles α1 to α4 of the four first body-side claw portion 290a to the fourth body-side claw portion 290d and the angles β1 to β4 of the four first body-side through portion 280a to the fourth body-side through portion 280d is 360 degrees.

The first body-side through portion 280a is formed in a region above the third body-side line B3 and below the fourth body-side line B4, the second body-side through portion 280b is disposed in a region above the third body-side line B3 and above the fourth body-side line B4, the third body-side through portion 280c is formed in a region below the third body-side line B3 and above the fourth body-side line B4, and the fourth body-side through portion 280d is formed in a region below the third body-side line B3 and below the fourth body-side line B4.

The first body-side through portion 280a and the third body-side through portion 280c are respectively formed in regions which are on the second body-side line B2 and which are substantially symmetric about the optical axis O. The second body-side through portion 280b and the fourth body-side through portion 280d are respectively formed in regions which are on the first body-side line B1 and which are substantially symmetric about the optical axis O.

Note that, as illustrated in FIG. 2, each of central positions or areas of the first body-side through portion 280a to the fourth body-side through portion 280d in relation with respective circumferential directions overlaps with neither the first body-side line nor the second body-side line B2.

The body-side terminal holding unit 220 including a plurality of body-side terminals is provided inside the opening 212 of the body-side mount 210. The body-side terminal holding unit 220 has an arc shape corresponding to a shape of the ring-shaped body-side mount 210. The body-side terminal holding unit 220 is disposed on an inner periphery side of the opening 212 of the body-side mount 210 and above the image sensor 270. The body-side terminal holding unit 220 is preferably disposed at the center above the image sensor 270 as illustrated in FIG. 2 and FIG. 3. That is, the center of the body-side terminal holding unit 220 in the circumferential direction is preferably located on the first body-side line B1.

The first body-side claw portion 290a is disposed on an upper right region of the body-side terminal holding unit 220, and the second body-side through portion 280b is disposed on an upper left region of the body-side terminal holding unit 220. Therefore, an angle formed by a line connecting one end of the body-side terminal holding unit 220 and the optical axis O and a line connecting the other end of the body-side terminal holding unit 220 and the optical axis O is smaller than a sum of the angle α1 of the first body-side claw portion 290a and the angle β2 of the second body-side through portion 280b.

As described above, the body-side terminal holding unit 220 is provided with a plurality of body-side terminals. The plurality of body-side terminals (which will be referred to as a body-side terminal group) are disposed above the upper side of the image sensor 270 in an arc shape. The body-side terminals are respectively conductive pins. The body-side terminals are urged toward the −Z direction (FIG. 1) by a spring, or the like, which is not illustrated.

The −Z direction is, that is, a direction from the camera body 2 toward the interchangeable lens 3, and is a direction toward the subject. The +Z direction is, that is, a direction from the interchangeable lens 3 toward the camera body 2, and is a direction toward the image sensor 270.

The body-side mount 210 has a hole through which a lock pin 214 passes. In FIGS. 2 and 3, the hole through which the lock pin 214 passes is formed on an upper right region of the fourth body-side claw portion 290d. That is, on a ring-shaped reference surface 211 of the body-side mount 210, the hole of the lock pin 214 is provided between a region where the fourth body-side claw portion 290d exists and a region where the first body-side claw portion 290a exists. The lock pin 214 is urged toward the −Z direction (the subject side) by a spring, or the like, which is not illustrated. The lock pin 214 can move to the +Z direction (to the image sensor 270) against urging force of the spring by an unlocking button which is not illustrated being depressed.

Figure 4:
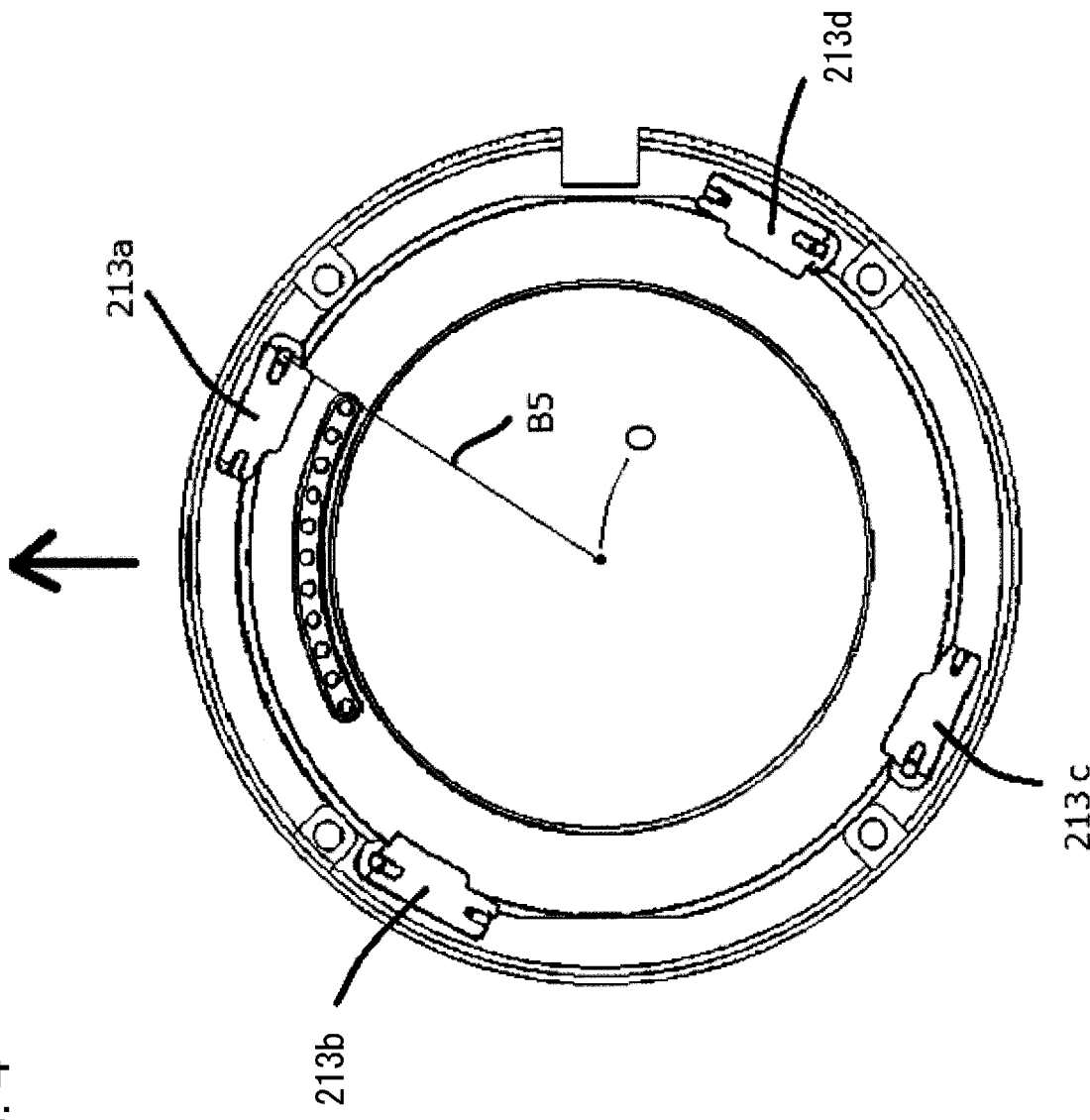
FIG. 4 is a front view of a flat spring at a body-side mount.

FIG. 4 is a schematic diagram of the mount of the camera body 2 from which the body-side mount 210 is removed, as seen from the interchangeable lens 3 side. A first flat spring 213a is provided at a position corresponding to the first body-side claw portion 290a or on the back side of the first body-side claw portion 290a.

In a similar manner, a second flat spring 213b is provided at a position corresponding to the second body-side claw portion 290b or on the back side of the second body-side claw portion 290b, a third flat spring 213c is provided at a position corresponding to the third body-side claw portion 290c or on the back side of the third body-side claw portion 290c, and a fourth flat spring 213d is provided at a position corresponding to the fourth body-side claw portion 290d on the back side of the fourth body-side claw portion 290d.

In the following explanation, these four first flat spring 213a to the fourth flat spring 213d will be collectively referred to as a flat spring 213. The flat spring 213 is disposed on a surface confronting the image sensor 270 of the body-side claw portion 290, and urges the corresponding lens-side claw portion (which will be described later) 390 to the image sensor 270 (+Z direction).

As illustrated in FIG. 4, a rear end or trailing end portion of the body-side terminal holding unit 220 in the attaching direction 44 (shown in FIG. 2) is disposed near a line B5 which connects the optical axis O and a rear end or trailing end portion of the first flat spring 213a in the attaching direction 44 (which will be described later). The second flat spring 213b, the third flat spring 213c and the fourth flat spring 213d are disposed around the optical axis O at intervals of approximately 90 degrees from the first flat spring 213a.

Lens-Side Mount 310

Figure 5:
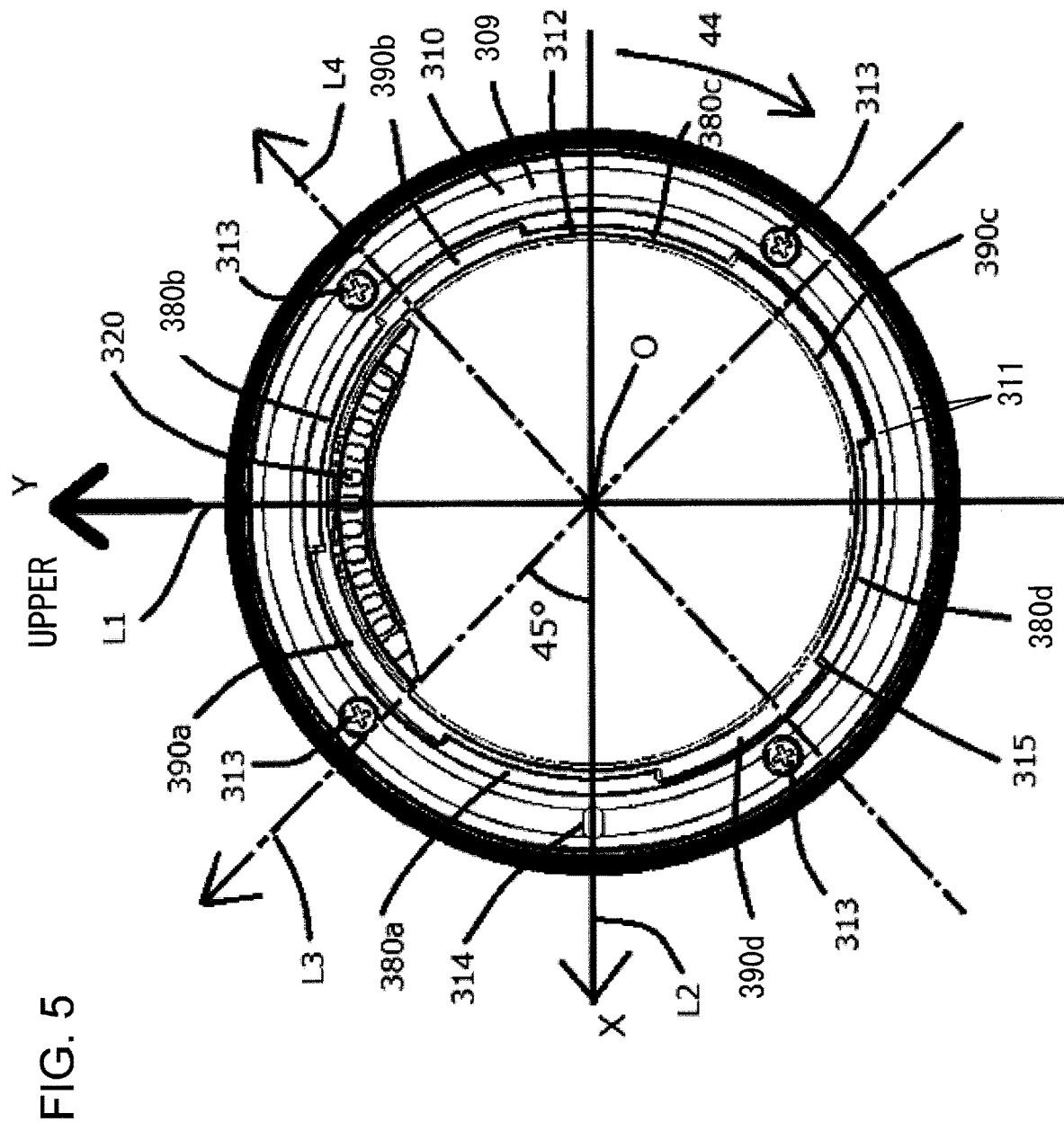
FIG. 5 is a front view of a mount surface of the interchangeable lens, as seen from the camera body side.
Figure 6:
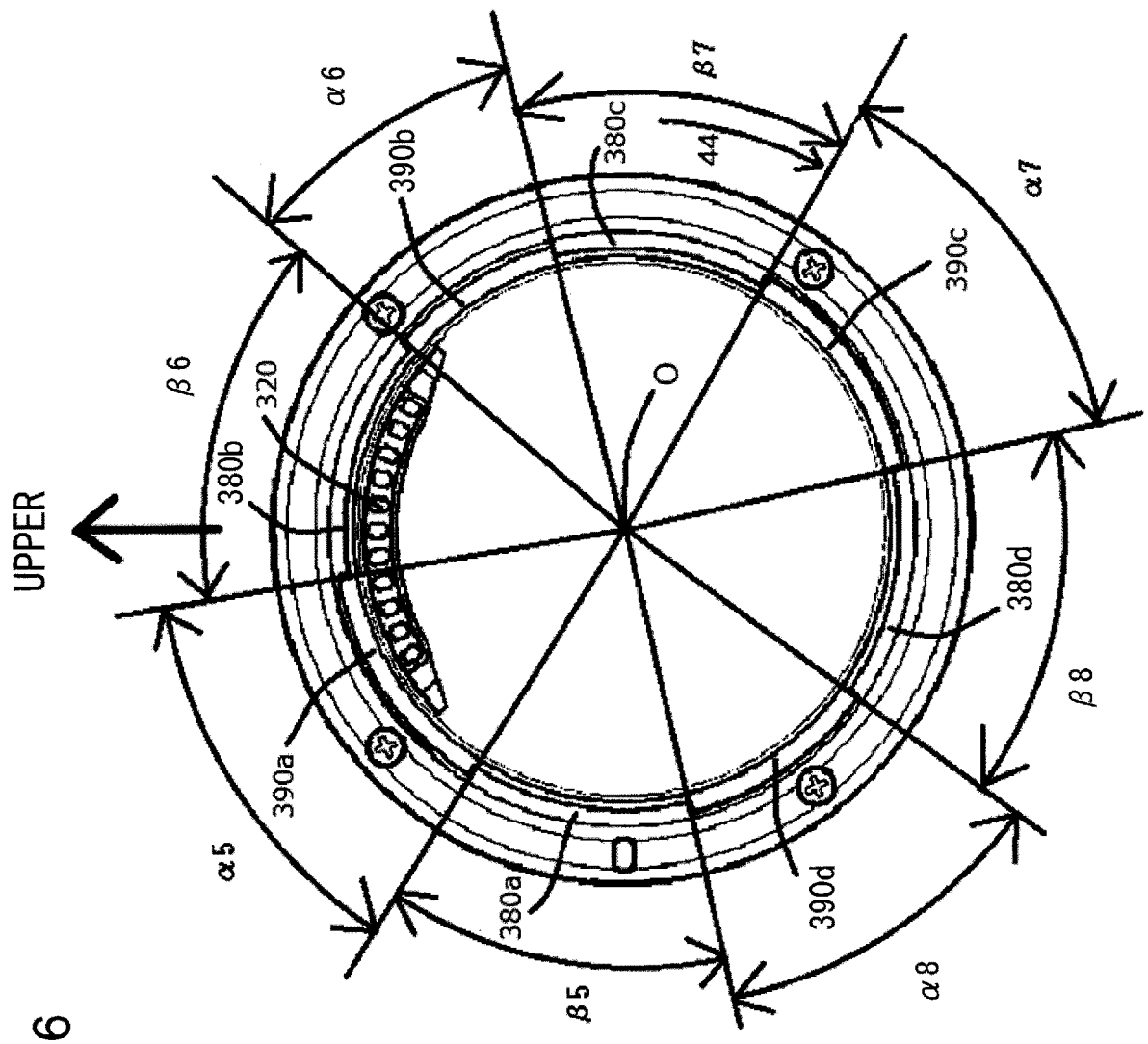
FIG. 6 is a front view of the mount surface of the interchangeable lens, as seen from the camera body side.

FIG. 5 and FIG. 6 are diagrams schematically illustrating the mount of the interchangeable lens 3 seen from the camera body 2 side (seen from back of the interchangeable lens 3). A first lens-side line L1 extending in a vertical direction Y of the interchangeable lens 3, indicated with a solid line in FIG. 5 is in a vertical direction seen from a photographer who laterally holds the camera body 2 in the laterally holding using the camera system 1. Further, a second lens-side line L2 extending in a horizontal direction X of the interchangeable lens 3, indicated with a solid line in FIG. 5 is in a horizontal direction seen from the photographer who laterally holds the camera body 2 in the laterally holding using the camera system 1.

The first lens-side line L1 is orthogonal to the second lens-side line L2 on the optical axis O (center) of the interchangeable lens 3. As indicated with a dashed-dotted line in FIG. 5, lines extending in directions intersecting with the first lens-side line L1 and the second lens-side line L2 on the optical axis O at 45 degrees are referred to as a third lens-side line L3 and a fourth lens-side line L4. With the interchangeable lens 3 attached to the camera body 2 in a usable manner, the first body-side line B1 is aligned with the first lens-side line L1, the second body-side line B2 is aligned with the second lens-side line L2, the third body-side line B3 is aligned with the fourth lens-side line L4, and the fourth body-side line B4 is aligned with the third lens-side line L3. Note that the lines do not have to completely are aligned with each other, and a gap may occur within a range in which the interchangeable lens 3 can be properly attached to the camera body 2 in a usable manner.

The mount of the interchangeable lens 3 includes the lens-side mount 310 and the lens-side terminal holding unit 320 mentioned above in FIG. 1. The lens-side mount 310 is formed in a circular shape centering around the optical axis O of the interchangeable lens 3, and is disposed along a surface orthogonal to the optical axis O. The lens-side mount 310 has a reference surface 311 which is to be in contact with the reference surface 211 of the body-side mount 210 once the interchangeable lens 3 is attached to the camera body 2. The reference surface 311 has a circular shape centering around the optical axis O, and is disposed along a surface orthogonal to the optical axis O. On a rear end surface of the reference surface 311 in the optical axis O direction, a slide surface for the lock pin 309 is formed in a concave shape recessed toward the −Z direction on a cross-section along the Z direction. A slide surface for the lock pin 309 allows the lock pin 214 which will be described later to slide in contacting state during the interchangeable lens 3 being attached. The slide surface for the lock pin 309 has a circular shape centering around the optical axis O, and is disposed along a surface orthogonal to the optical axis O.

The lens-side mount 310 is fixed by being screwed at a fixing member disposed inside the interchangeable lens 3 using screws 313. In the case where the lens-side mount 310 is seen from the camera body 2 side, the screws 313 are disposed around the optical axis O at intervals of approximately 90 degrees. Further, four screws 313 are respectively disposed on outer peripheries of four lens-side claw portions 390 which will be described later. Still further, the screws 313 are disposed on outer peripheries at both end portions of the lens-side terminal holding unit 320 in the circumferential direction.

The lens-side mount 310 includes a cylindrical portion 312. The cylindrical portion 312 extends in the direction along the optical axis O (herein after referred to as the optical axis O direction) at an inner peripheral edge portion of the lens-side mount 310, that is an inner peripheral edge portion of the reference surface 311. Once the interchangeable lens 3 is attached to the camera body 2, a rear end of the cylindrical portion 312 in the optical axis O direction is located at the camera body 2 side than the reference surface 311. The lens-side mount 310 includes a first lens-side claw portion 390a, a second lens-side claw portion 390b, a third lens-side claw portion 390c and a fourth lens-side claw portion 390d. These four lens-side claw portions are arranged along an outer periphery of the rear end portion of the cylindrical portion 312 in the optical axis O direction at intervals.

In the following explanation, these four first lens-side claw portion 390a to fourth lens-side claw portion 390d which are projecting portions will be collectively referred to as a lens-side claw portion 390.

The lens-side claw portion 390 is provided at an outer peripheral edge portion of the cylindrical portion 312 of the lens-side mount 310 to project toward an outer periphery direction of the lens-side mount 310. The lens-side claw portion 390 is substantially orthogonal to the optical axis O. Further, the lens-side claw portion 390 extends in the circumferential direction around the optical axis O. As illustrated in FIG. 5 and FIG. 6, the first lens-side claw portion 390a is disposed at an upper left position, the second lens-side claw portion 390b is disposed at an upper right position, the third lens-side claw portion 390c is disposed at a lower right position, and the fourth lens-side claw portion 390d is disposed at a lower left position. That is, the first lens-side claw portion 390a is disposed in a region which is above the second lens-side line L2 and which is on the left side of the first lens-side line L1, the second lens-side claw portion 390b is disposed in a region which is above the second lens-side line L2 and which is on the right side of the first lens-side line L1, the third lens-side claw portion 390c is disposed in a region which is below the second lens-side line L2 and which is on the right side of the first lens-side line L1, and the fourth lens-side claw portion 390d is disposed in a region which is below the second lens-side line L2 and which is on the left side of the first lens-side line L1.

Further, the first lens-side claw portion 390a and the third lens-side claw portion 390c are respectively disposed in regions which are on the third lens-side line L3 and which are substantially symmetric about the optical axis O, and the second lens-side claw portion 390b and the fourth lens-side claw portion 390d are respectively disposed in regions which are on the fourth lens-side line L4 and which are substantially symmetric about the optical axis O.

Note that the third lens-side line L3 and the fourth lens-side line L4 do not necessarily pass through the central positions of the first lens-side claw portion 390a to the fourth lens-side claw portion 390d in relation to respective circumferential directions.

Once the interchangeable lens 3 is attached to the camera body 2, the body-side claw portion 290 is disposed between the lens-side mount 310 and the lens-side claw portion 390 in the optical axis O direction. At this time, the first lens-side claw portion 390a comes into contact with the flat spring 213a of the first body-side claw portion 290a, the second lens-side claw portion 390b comes into contact with the flat spring 213b of the second body-side claw portion 290b, the third lens-side claw portion 390c comes into contact with the flat spring 213c of the third body-side claw portion 290c, and the fourth lens-side claw portion 390d comes into contact with the flat spring 213d of the fourth body-side claw portion 290d.

The lens-side claw portion 390 includes a urged portion as a contact portion which is urged in a direction away from the body-side claw portion 290 by being brought into contact with the flat spring 213. Note that the urged portion may have any shape if the lens-side claw portion 390 can receive sufficient urging force from the flat spring 213, and contact between the flat spring 213 and the urged portion may be one of point contact, line contact and surface contact. The flat spring 213 may have any shape and material if the flat spring 213 can sufficiently press the lens-side claw portion 390, and the shape and the material can be changed as appropriate.

Once the flat spring 213 of the body-side claw portion 290 comes into contact with the lens-side claw portion 390, the lens-side claw portion 390 is pressed in a direction (+Z direction) away from the body-side claw portion 290 along the optical axis O by the flat spring 213. By the lens-side claw portion 390 being pressed in the +Z direction (toward the image sensor 270), the lens-side mount 310 is pressed toward the body-side mount 210, and attachment between the camera body 2 and the interchangeable lens 3 becomes stable.

Note that the lengths of the lens-side claw portion 390 and the body-side claw portion 290 in the circumferential direction do not have to be made the same, and the length of the lens-side claw portion 390 in the circumferential direction can be changed as long as the flat spring 213 can urge the lens-side claw portion 390. Further, the whole surface of the lens-side claw portion 390 does not have to face the whole surface of the body-side claw portion 290 in a state where the interchangeable lens 3 is attached to the camera body 2, and a position of an end portion of the lens-side claw portion 390 in the circumferential direction may be different from a position of an end portion of the body-side claw portion 290 in the circumferential direction.

Further, lengths of the lens-side claw portion 390 and the body-side through portion 280 in the circumferential direction do not have to be made substantially the same, and the length of the lens-side claw portion 390 to be inserted, in the circumferential direction only has to be equal to or less than the length of the body-side through portion 280 in the circumferential direction.

In a similar manner, lengths of the body-side claw portion 290 and the lens-side through portion 380 in the circumferential direction do not have to be made the same, and the length of the body-side claw portion 290 to be inserted, in the circumferential direction only has to be equal to or less than the length of the lens-side through portion 380 in the circumferential direction.

As illustrated in FIG. 6, lengths of the first lens-side claw portion 390a to the fourth lens-side claw portion 390d in the circumferential direction are different from one another. Further, angles respectively formed by lines connecting one ends of the first lens-side claw portion 390a to the fourth lens-side claw portion 390d in the circumferential direction and the optical axis O and lines connecting the other ends of the first lens-side claw portion 390a to the fourth lens-side claw portion 390d in the circumferential direction and the optical axis O are different from one another. Specifically, the third lens-side claw portion 390c is the longest, the first lens-side claw portion 390a is the second longest, the fourth lens-side claw portion 390d is the third longest, and the second lens-side claw portion 390b is the shortest.

An angle α7 formed by a line connecting one end of the third lens-side claw portion 390c and the optical axis O and a line connecting the other end of the third lens-side claw portion 390c and the optical axis O is approximately 48.5 degrees, and is between 48.0 degrees and 49.0 degrees.

An angle α5 formed by a line connecting one end of the first lens-side claw portion 390a and the optical axis O and a line connecting the other end of the first lens-side claw portion 390a and the optical axis O is approximately 48 degrees, and is between 47.5 degrees and 48.5 degrees.

An angle α8 formed by a line connecting one end of the fourth lens-side claw portion 390d and the optical axis O and a line connecting the other end of the fourth lens-side claw portion 390d and the optical axis O is approximately 44 degrees, and is between 43.0 degrees and 45.0 degrees.

An angle α6 formed by a line connecting one end of the second lens-side claw portion 390b and the optical axis O and a line connecting the other end of the second lens-side claw portion 390b and the optical axis O is approximately 36 degrees, and is between 35.5 degrees and 36.5 degrees.

Note that the angle α6 formed by the line connecting the one end of the second lens-side claw portion 390b and the optical axis O and the line connecting the other end of the second lens-side claw portion 390b and the optical axis O is less than an angle of rotation required to rotate the interchangeable lens 3 for attaching to the camera body 2. The rotation angle will be described later.

Lengths of the first lens-side claw portion 390a to the fourth lens-side claw portion 390d in a radial direction (heights of the claw portions) are substantially the same. Further, lengths of the first lens-side claw portion 390a to the fourth lens-side claw portion 390d in the optical axis O (thicknesses of the claw portions) direction are substantially the same.

Note that at least one of the lens-side claw portions 390 may be partially cut out as long as an attachment incompletion state between the camera body 2 and the interchangeable lens 3 is not affected. In the case where part of the first lens-side claw portion 390a is cut out, the whole including a projecting portion and a cut out portion disposed in a region facing the first body-side claw portion 290a is considered to be the first lens-side claw portion 390a. This will similarly apply to other second to fourth lens-side claw portions 390b to 390d. As a way of cutting out the lens-side claw portion, the first lens-side claw portion 390a may be cut out so as to be divided into two or more portions in the circumferential direction, or may be cut out so that part of the first lens-side claw portion 390a is cut out, or may be cut out so that a length of at least part of the first lens-side claw portion 390a in the radial direction becomes shorter. Therefore, part of the lens-side claw portion 390 on the third lens-side line L3 or the fourth lens-side line L4 may be cut out.

Further, a length of the first lens-side claw portion 390a in the circumferential direction may be changed as long as the first lens-side claw portion 390a passes through the corresponding first body-side through portion 280a upon insertion. This will similarly apply to the second lens-side claw portion 390b, the third lens-side claw portion 390c and the fourth lens-side claw portion 390d.

Still further, a thickness of the cylindrical portion 312 in the radial direction can be changed as appropriate, and it is also possible to employ a shape in which at least part projects to an inner diameter side of the cylindrical portion 312 of the present embodiment.

The lens-side claw portion 390 projects outward in the radial direction from an outer periphery of the cylindrical portion 312, and there is a portion where the lens-side claw portion 390 exists and a space portion where the lens-side claw portion 390 does not exist on the outer periphery of the cylindrical portion 312.

In the following explanation, space 380d between the first lens-side claw portion 390a and the fourth lens-side claw portion 390d on the outer periphery of the cylindrical portion 312 will be referred to as a first lens-side through portion 380a.

In a similar manner, space 380b between the first lens-side claw portion 390a and the second lens-side claw portion 390b will be referred to as a second lens-side through portion 380b, space 380c between the second lens-side claw portion 390b and the third lens-side claw portion 390c will be referred to as a third lens-side through portion 380c, and space 380d between the third lens-side claw portion 390c and the fourth lens-side claw portion 390d will be referred to as a fourth lens-side through portion 380d.

These four first lens-side through portion 380a to fourth lens-side through portion 380d will be collectively referred to as a lens-side through portion 380.

Lengths of the first lens-side through portion 380a to the fourth lens-side through portion 380d in the circumferential direction are different from one another. Specifically, the second lens-side through portion 380b is the longest, the first lens-side through portion 380a is the second longest, the fourth lens-side through portion 380d is the third longest, and the third lens-side through portion 380c is the shortest.

An angle β6 formed by a line connecting one end of the second lens-side through portion 380b and the optical axis O and a line connecting the other end of the second lens-side through portion 380b and the optical axis O is approximately 50 degrees, and is between 49.5 degrees and 50.5 degrees.

An angle β5 formed by a line connecting one end of the first lens-side through portion 380a and the optical axis O and a line connecting the other end of the first lens-side through portion 380a and the optical axis O is approximately 45 degrees, and is between 44.5 degrees and 45.5 degrees.

An angle β8 formed by a line connecting one end of the fourth lens-side through portion 380d and the optical axis O and a line connecting the other end of the fourth lens-side through portion 380d and the optical axis O is approximately 44.5 degrees, and is between 44.0 degrees and 45.0 degrees.

An angle β7 formed by a line connecting one end of the third lens-side through portion 380c and the optical axis O and a line connecting the other end of the third lens-side through portion 380c and the optical axis O is approximately 44 degrees, and is between 43.5 degrees and 44.5 degrees.

Of course, a sum of the angles α5 to α8 of the four first lens-side claw portion 390a to the fourth lens-side claw portion 390d and the angles 135 to 138 of the four first lens-side through portion 380a to the fourth lens-side through portion 380d is 360 degrees.

Further, the first lens-side through portion 380a and the third lens-side through portion 380c are respectively disposed in regions which are on the second lens-side line L2 and which are substantially symmetric about the optical axis O, and the second lens-side through portion 380b and the fourth lens-side through portion 380d are respectively disposed in regions which are on the first lens-side line L1 and which are substantially symmetric about the optical axis O.

Note that the first lens-side line L1 and the second lens-side line L2 do not have to pass through central positions in relation to the circumferential direction of the first lens-side through portion 380a to the fourth lens-side through portion 380d.

The lens-side terminal holding unit 320 including a plurality of lens-side terminals is provided inside the cylindrical portion 312. The lens-side terminal holding unit 320 has an arc shape corresponding to a shape of the ring-shaped lens-side mount 310. The lens-side terminal holding unit 320 is preferably disposed at an upper part of the lens-side mount 310 along the opening of the lens-side mount 310 and disposed at the center of the upper part as illustrated in FIG. 5 and FIG. 6. That is, the center of the lens-side terminal holding unit 320 in the circumferential direction is preferably located on the first lens-side line L1.

The first lens-side claw portion 390a is disposed on an upper left side of the lens-side terminal holding unit 320, and the second lens-side through portion 380b is disposed on an upper right side of the lens-side terminal holding unit 320. Therefore, an angle formed by a line connecting one end of the lens-side terminal holding unit 320 and the optical axis O and a line connecting the other end of the lens-side terminal holding unit 320 and the optical axis O is smaller than a sum of the angle α5 of the first lens-side claw portion 390a and the angle β6 of the second lens-side through portion 380b.

The lens-side terminal holding unit 320 has the plurality of lens-side terminals as described above. The plurality of lens-side terminals (which will be referred to as a lens-side terminal group) are disposed at the lens-side terminal holding unit 320 in a line inside the lens-side mount 310 in an arc shape. The lens-side terminal group is disposed so that respective conductive contact surfaces are exposed toward +Z direction (FIG. 1).

All the contact surfaces of the plurality of lens-side terminals may be located at a position in the +Z direction side from a rear end of the lens-side claw portion 390 in the optical axis O direction or may be located at a position in the −Z direction side from the rear end of the lens-side claw portion 390 in the optical axis O direction.

Further, part of the contact surfaces of the plurality of lens-side terminals may be located at a position in the +Z direction side from the rear end of the lens-side claw portion 390 in the optical axis O direction, and the remaining contact surfaces may be located at a position in the −Z direction side from the rear end of the lens-side claw portion 390 in the optical axis O direction.

The lens-side mount 310 has a lock pin receiving portion 314. The lock pin receiving portion 314 is disposed on an upper left side of the fourth lens-side claw portion 390*d* as illustrated in FIG. 5 and FIG. 6. That is, the lock pin receiving portion 314 is disposed between a portion corresponding to an outer periphery side of the first lens-side claw portion 390*a* and a portion corresponding to an outer periphery side of the fourth lens-side claw portion 390*d* among the slide surface for the lock pin 309 of the lens-side mount 310.

The lock pin receiving portion 314 is a groove in which the lock pin 214 of the camera body 2 fits once the interchangeable lens 3 is attached to the camera body 2. This groove is provided in a concave shape recessed toward the −Z direction (FIG. 1) from the slide surface for the lock pin 309 of the lens-side mount 310.

In a state where the unlocking button of the camera body 2 is not depressed, an end portion of the lock pin 214 in the −Z direction (front end of the lock pin 214 on the subject side) fits in the lock pin receiving portion 314 of the lens-side mount 310. Further, in a state where the unlocking button of the camera body 2 is depressed, an end portion of the lock pin 214 in the −Z direction is located at a position in the +Z direction side from the slide surface for the lock pin 309. Therefore, rotating the interchangeable lens 3 and the camera body 2 relatively to each other while the unlocking button of the camera body 2 is depressed does not bring the lock pin 214 into contact with the slide surface for the lock pin 309.

Once the interchangeable lens 3 is attached to the camera body 2, the plurality of body-side terminals respectively physically come into contact with the corresponding plurality of lens-side terminals. By this contact, the plurality of body-side terminals are electrically connected to the plurality of lens-side terminals. That is, the plurality of body-side terminals are electrically conductive with the plurality of lens-side terminals.

Figure 7:
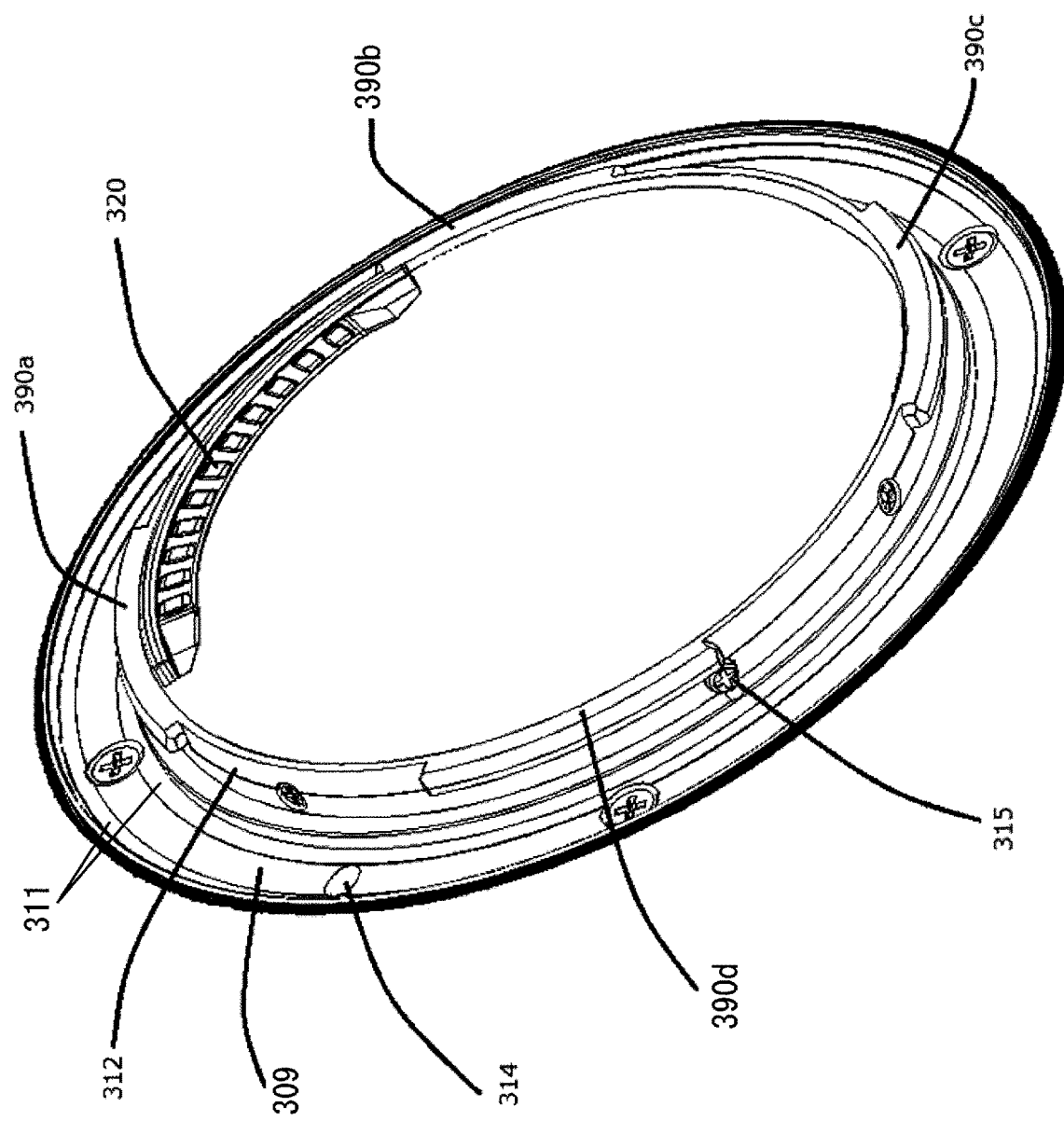
FIG. 7 is a perspective view of the mount surface of the interchangeable lens.

As illustrated in FIG. 7, a restriction pin 315 is disposed between the reference surface 311 of the lens-side mount 310 and the fourth lens-side claw portion 390*d* and projects from an outer peripheral surface of the cylindrical portion 312. The restriction pin 315 is disposed on a rear end side or trailing side (position close to the third lens-side claw portion 390*c*) of the fourth lens-side claw portion 390*d* in the attaching direction 44. Part of the restriction pin 315 is disposed on a back side of the fourth lens-side claw portion 390*d* as the fourth lens-side claw portion 390*d* is seen from the back of the interchangeable lens 3.

Note that, while, in the present embodiment, a screw member is used as the restriction pin 315, and the restriction pin 315 is screwed at the cylindrical portion 312 from outside in the radial direction, the shape and the material of the restriction pin 315 are not limited to this.

Method for Attaching Interchangeable Lens 3 to Camera Body 2

Figure 8:
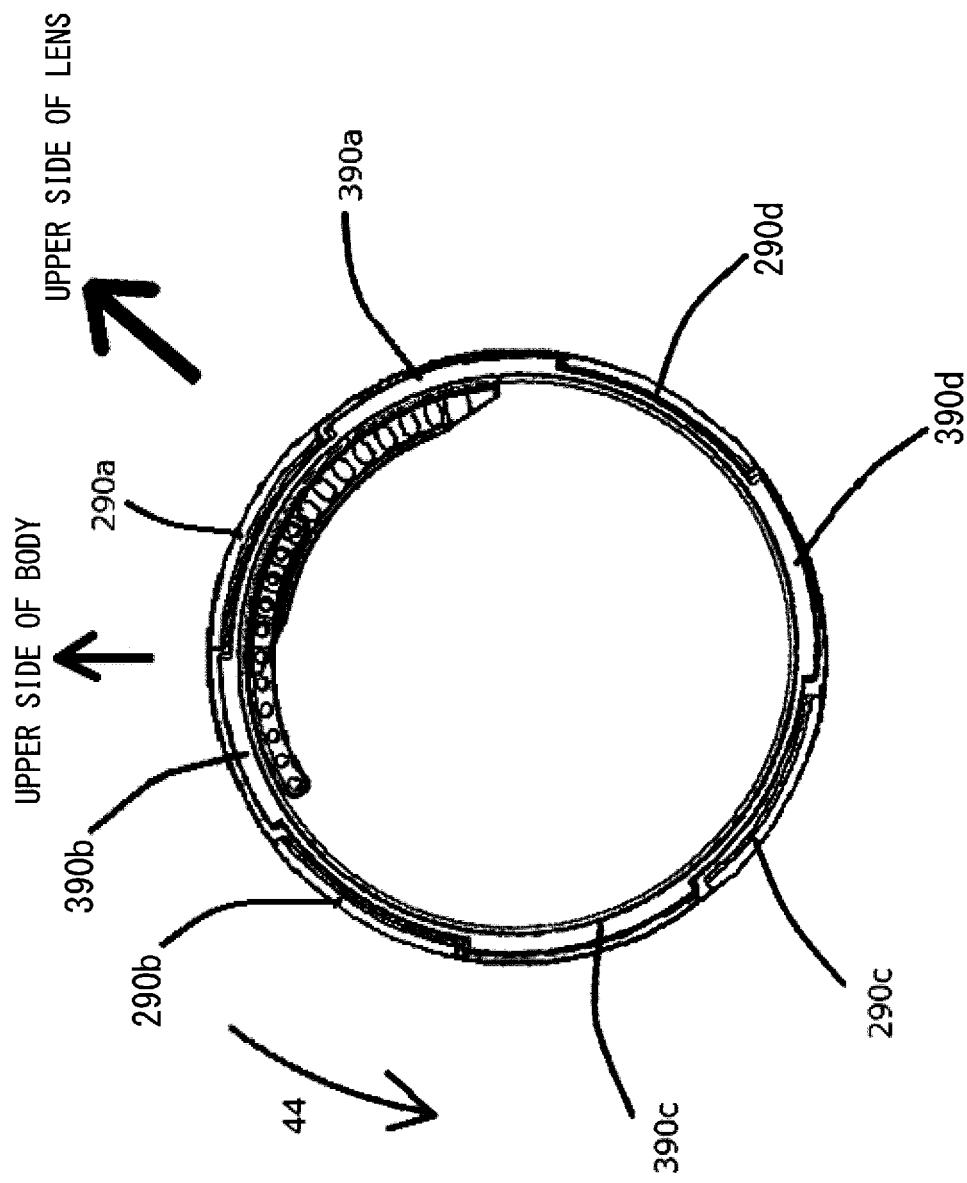
FIG. 8 is a front view of a body-side claw portion and a lens-side claw portion at an insertion position, as seen from the interchangeable lens side.
Figure 9:
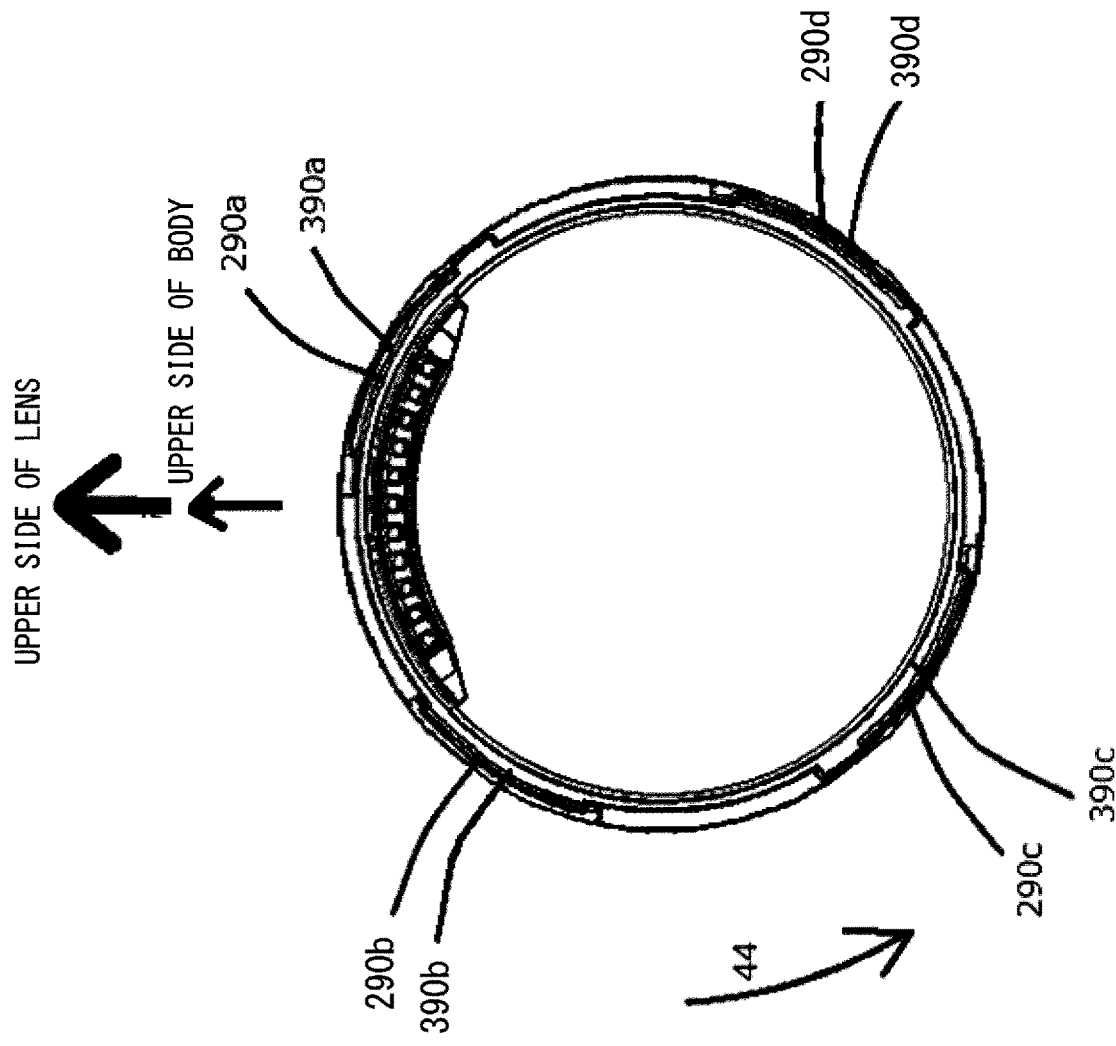
FIG. 9 is a front view of the body-side claw portion and the lens-side claw portion at an attachment position, as seen from the interchangeable lens side.

A method for attaching the interchangeable lens 3 to the camera body 2 will be described next with reference to FIG. 8 and FIG. 9. FIG. 8 and FIG. 9 are diagrams illustrating positional relationship between the body-side claw portion 290 of the camera body 2 and the lens-side claw portion 390 of the interchangeable lens 3, and are diagrams for making a state where the claw portions abut on each other understandable. Further, FIG. 8 and FIG. 9 are diagrams of the body-side mount 210 and the lens-side mount 310, as seen from the subject side to the image sensor 270 side (seen in the +Z direction), and the lens-side mount 310 is horizontally inverted between FIG. 5 and FIG. 6.

When the interchangeable lens 3 is attached to the camera body 2, first, a position of an index (not illustrated) provided on the outer peripheral surface side of the interchangeable lens 3 and a position of an index (not illustrated) provided on an exterior surface of the camera body 2 are aligned, the body-side mount 210 and the lens-side mount 310 are made to face each other, and each lens-side claw portion 390 is inserted into each body-side through portion 280. That is, as illustrated in FIG. 8, the first lens-side claw portion 390*a* is inserted into the first body-side through portion 280*a*, the second lens-side claw portion 390*b* is inserted into the second body-side through portion 280*b*, the third lens-side claw portion 390*c* is inserted into the third body-side through portion 280*c*, and the fourth lens-side claw portion 390*d* is inserted into the fourth body-side through portion 280*d*. At this time, the first body-side claw portion 290*a* is inserted into the second lens-side through portion 380*b*, the second body-side claw portion 290*b* is inserted into the third lens-side through portion 380*c*, the third body-side claw portion 290*c* is inserted into the fourth lens-side through portion 380*d*, and the fourth body-side claw portion 290*d* is inserted into the first lens-side through portion 380*a*. A position of the interchangeable lens 3 with respect to the camera body 2 at this time will be referred to as an insertion position and state where the interchangeable lens 3 at the insertion position can be inserted to the camera body 2 is insertion state.

The interchangeable lens 3 is rotated in the attaching direction 44 illustrated in FIG. 8 from the above-described insertion position. The attaching direction 44 is a direction along the circumferential direction around the optical axis O in a plane which is substantially orthogonal to the optical axis O. In association with rotation of the interchangeable lens 3, the first body-side claw portion 290*a* and the flat spring 213*a* go into space between the first lens-side claw portion 390*a* and the reference surface 311.

Specifically, the interchangeable lens 3 is inserted in +Z direction, the first lens-side claw portion 390*a* goes into the image sensor 270 side (+Z side) of the first body-side claw portion 290*a*, and the first lens-side claw portion 390*a* faces the image sensor 270 side (+Z side) of the flat spring 213*a*. In conjunction with this, the first body-side claw portion 290*a* and the flat spring 213*a* go into space between the first lens-side claw portion 390*a* and the reference surface 311. In a similar manner, the second body-side claw portion 290*b* and the flat spring 213*b* go into space between the second lens-side claw portion 390*b* and the reference surface 311, the third body-side claw portion 290*c* and the flat spring 213*c* go into space between the third lens-side claw portion 390*c* and the reference surface 311, and the fourth body-side claw portion 290*d* and the flat spring 213*d* go into space between the fourth lens-side claw portion 390*d* and the reference surface 311. At this time, the lens-side terminals sequentially come into contact with the body-side terminals.

Note that, while the interchangeable lens 3 is made to rotate in the attaching direction 44 with respect to the camera body 2, it is also possible to make the camera body 2 rotate in an opposite direction to the attaching direction 44 with respect to the interchangeable lens 3.

FIG. 9 is a diagram of the interchangeable lens 3 which is rotated in the attaching direction 44 by a first angle (hereinafter referred to as first rotating angle) with respect to the camera body 2 from the insertion position in FIG. 8, and illustrates a state where attachment of the interchangeable lens 3 to the camera body 2 is completed. The position of the interchangeable lens 3 at this time will be referred to as an attachment position. The first rotating angle is approximately 40 degrees in the present embodiment, and is between 38.5 degrees and 41.5 degrees.

At the attachment position, the lock pin 214 of the camera body 2 being pushed to the −Z direction goes into the lock pin receiving portion 314 of the interchangeable lens 3. After the lock pin 214 goes into the lock pin receiving portion 314, rotation of the interchangeable lens 3 to be removed from the camera body 2 is restricted. That is, when each body-side claw portion 290 and each lens-side claw portion 390 face each other completely in the attachment position of the interchangeable lens 3, relative positions between the body-side mount 210 and the lens-side mount 310 in the circumferential direction are determined.

Further, the lens-side claw portion 390 is pushed to the image sensor 270 side (+Z direction) by the flat spring 213 and the reference surface 311 of the lens-side mount 310 comes into contact with the reference surface 211 of the body-side mount 210. By the lens-side mount 310 being in surface contact with the body-side mount 210 and being urged by the flat spring 213, the interchangeable lens 3 is tightly attached to the camera body 2.

At the attachment position, the plurality of lens-side terminals respectively come into contact with the corresponding plurality of body-side terminals, and are electrically connected to the plurality of body-side terminals.

Further, a state where each lens-side claw portion 390 is inserted into each corresponding body-side through portion 280 at the insertion position in FIG. 8 until immediately before the attachment position in FIG. 9 will be referred to as an attachment incompletion state. Because the lock pin 214 of the camera body 2 is pushed in the −Z direction, in the attachment incompletion state, an end portion of the lock pin 214 in the −Z direction is in contact with the slide surface for the lock pin 309 of the lens-side mount 310.

In association with rotation of the interchangeable lens 3, the end portion of the lock pin 214 in the −Z direction slides on the slide surface for the lock pin 309 of the interchangeable lens 3. Therefore, in a first rotating angle range in an opposite direction to the attaching direction 44 from the lock pin receiving portion 314 of the slide surface for the lock pin 309, a fixing screw for fixing the lens-side mount 310 is not disposed. By a fixing screw not being disposed in the above-described first rotating angle range in the opposite direction, because the end portion of the lock pin 214 in the −Z direction does not abut on the fixing screw as the end portion of the lock pin 214 slides on the slide surface for the lock pin 309, it is possible to smoothly attach and remove the interchangeable lens 3.

Method for Removing Interchangeable Lens 3 from Camera Body 2

If a user depresses the unlocking button which is not illustrated of the camera body at the attachment position, the lock pin 214 evacuates from the lock pin receiving portion 314 to the image sensor 270 side. By this means, restriction on rotation of the interchangeable lens 3 with respect to the camera body 2 is cancelled, so that the lens-side mount 310 is allowed to rotate with respect to the body-side mount 210. If the interchangeable lens 3 is rotated in a direction opposite to the attaching direction 44 (removing direction) with respect to the camera body 2 while the unlocking button which is not illustrated is depressed, each lens-side claw portion 390 moves to a position of each body-side through portion 280 from a position facing an image side surface of each body-side claw portion 290, and reaches the insertion position illustrated in FIG. 8.

Explanation of an Over-Rotated State in Attaching Direction

Figure 10:
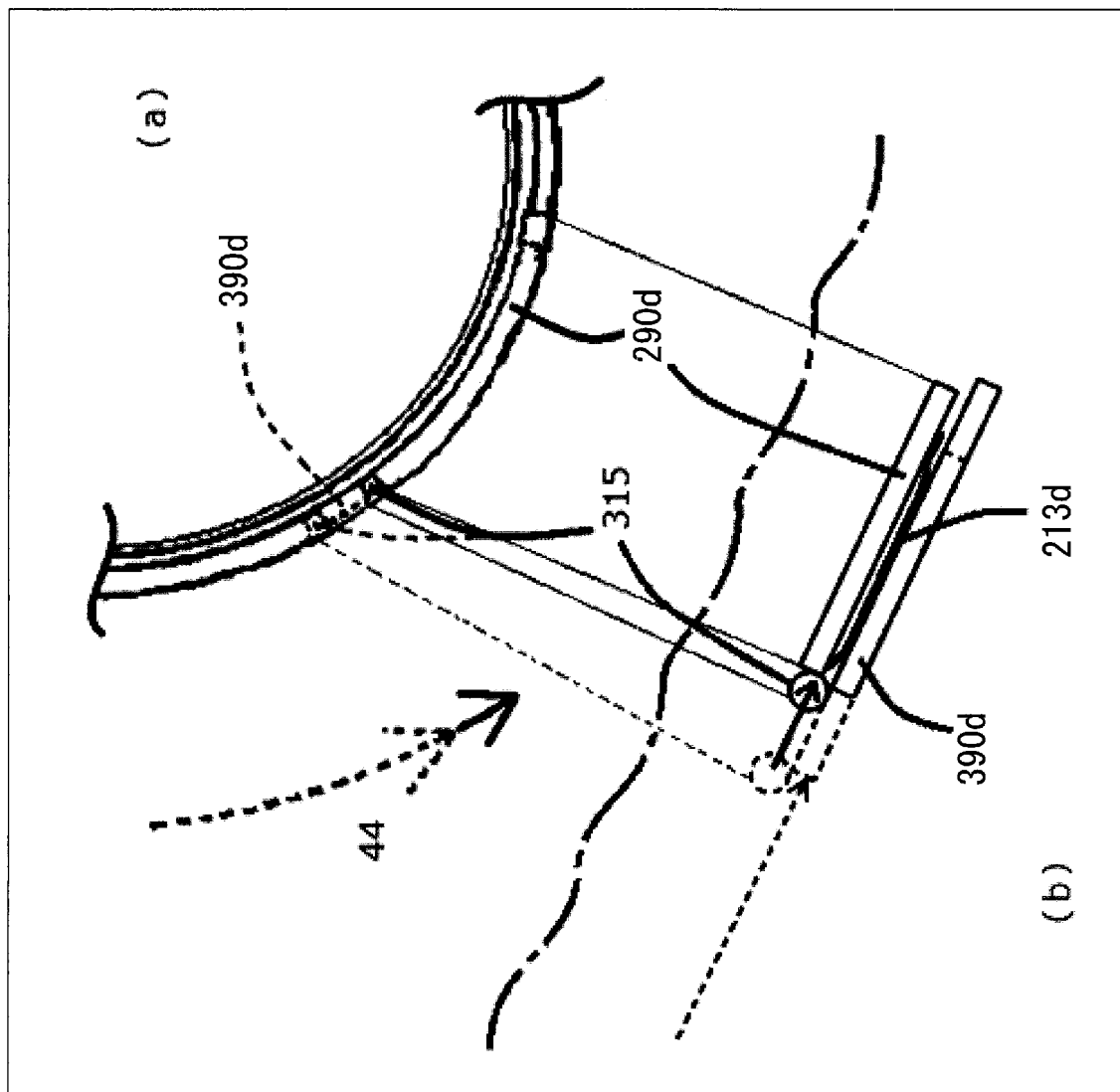
FIG. 10 is a front view and a side view of the body-side claw portion and the lens-side claw portion in an over-rotated state in an attaching direction, as seen from the interchangeable lens side.

An over-rotated state where the interchangeable lens 3 is rotated in the attaching direction 44 with respect to the camera body 2 by equal to or greater than the first rotating angle will be described next with reference to FIG. 10. FIG. 10 is a schematic diagram illustrating positional relationship between the fourth body-side claw portion 290d of the camera body 2 and the fourth lens-side claw portion 390d of the interchangeable lens 3. A part (a) on an upper side of a dashed-dotted line is a diagram seen from the subject side to the image sensor 270 side, and a part (b) on a lower side of the dashed-dotted line is a diagram of a lens mount mechanism seen from a side. In an operation of attaching the interchangeable lens 3 to the camera body 2, if the user rotates the interchangeable lens 3 in the attaching direction 44 while depressing the unlocking button, the lock pin 214 does not go into the lock pin receiving portion 314 at the attachment position. Therefore, it is possible to rotate the interchangeable lens 3 further from the attachment position illustrated in FIG. 9 with respect to the camera body 2. In the case where the interchangeable lens 3 is rotated in the attaching direction 44 further from the attachment position with respect to the camera body 2, the restriction pin 315 abuts on the rear end or trailing end of the fourth body-side claw portion 290d in the attaching direction 44, and further rotation of the interchangeable lens 3 with respect to the camera body 2 is prevented.

Explanation of Over-Rotated State in Removing Direction

Figure 11:
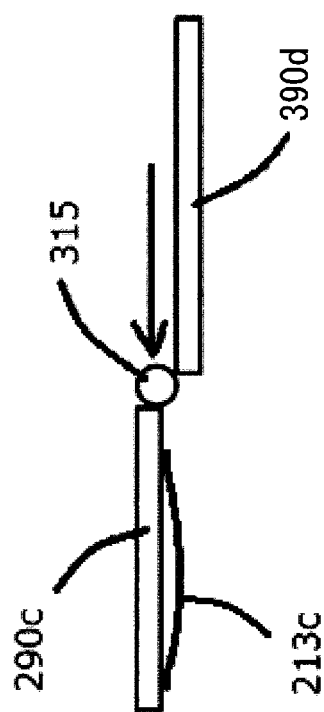
FIG. 11 is a side view of the body-side claw portion and the lens-side claw portion in the over-rotated state in a removing direction, as seen from the interchangeable lens side.

An over-rotated state where the interchangeable lens 3 is rotated from the insertion position in a direction opposite to the attaching direction 44 (removing direction) with respect to the camera body 2 will be described next with reference to FIG. 11. FIG. 11 is a diagram of part of the lens mount mechanism in the over-rotated state in the removing direction, as seen from a side. Because as shown in FIG. 7, the restriction pin 315 is disposed at a trailing end portion of the fourth lens-side claw portion 390d in the attaching direction 44, if the user tries to inversely rotate the interchangeable lens 3 after the interchangeable lens 3 is inserted into the camera body 2, the restriction pin 315 abuts on a tip of the third body-side claw portion 290c in the attaching direction 44, so that further rotation of the interchangeable lens 3 in the removing direction with respect to the camera body 2 is prevented.

In this manner, by the restriction pin 315 abutting on the end portion of the body-side claw portion 290 in the circumferential direction, both over rotation in the attaching direction 44 and over rotation in the removing direction are prevented. Because the restriction pin 315 prevents both the over rotation in the attaching direction 44 and the over rotation in the removing direction, it is not necessary to prepare two members for preventing over rotation in the attaching direction 44 and for preventing over rotation in the removing direction.

Further, because the restriction pin 315 prevents over rotation by utilizing the end portion of the body-side claw portion 290 in the circumferential direction, it is not necessary to separately provide a member which abuts on the restriction pin 315 upon over rotation.

Explanation of Erroneous Insertion State

Figure 12:
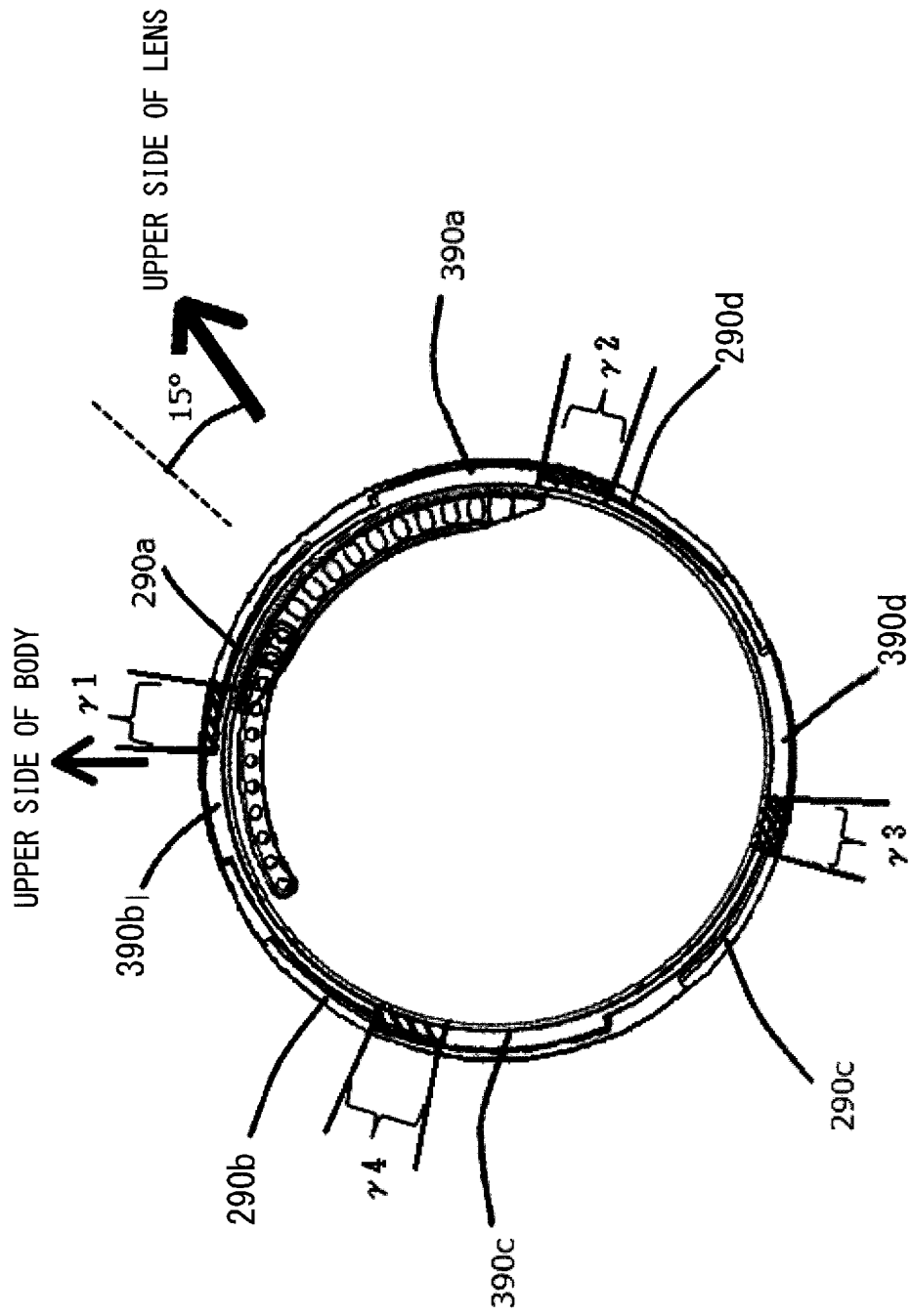
FIG. 12 is a front view of the body-side claw portion and the lens-side claw portion in a first erroneous insertion state, as seen from the interchangeable lens side.
Figure 13A:
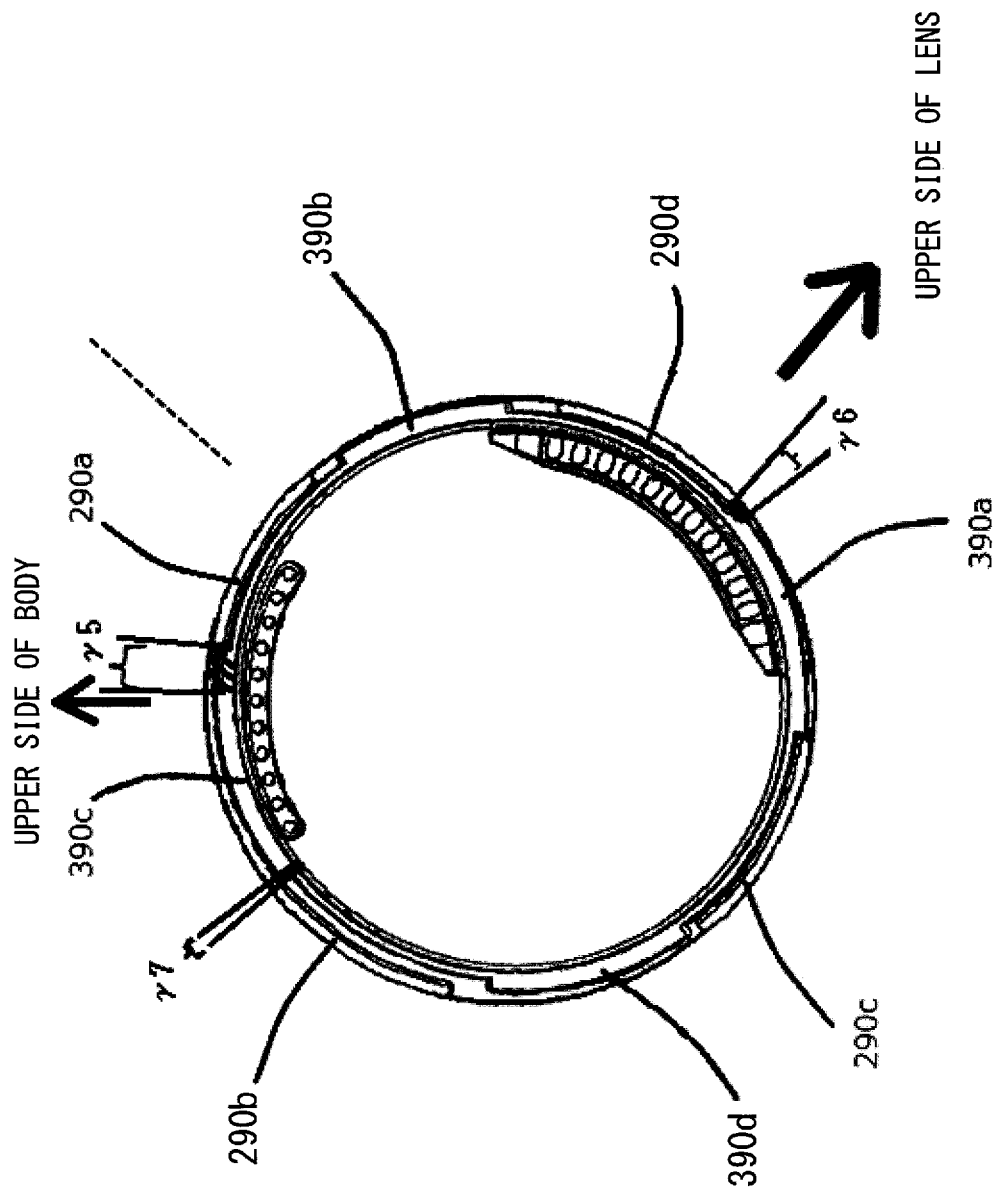
Figure 13B:
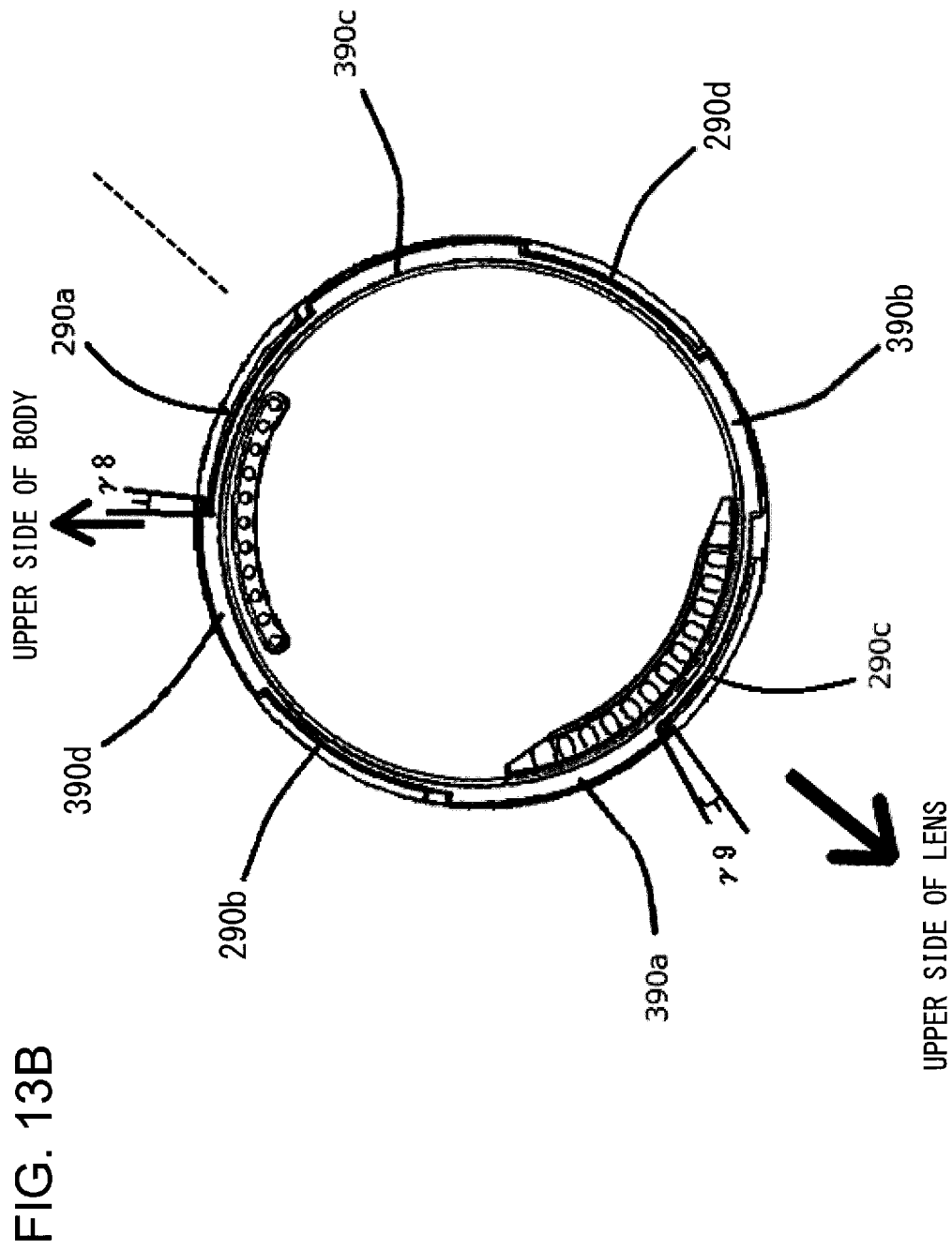

An erroneous insertion state where the user tries to insert the interchangeable lens 3 into the camera body 2 at a wrong position without aligning the index of the interchangeable lens 3 and the index of the camera body 2 will be described next. Because the lens-side claw portion 390 does not pass through the body-side through portion 280 in an erroneous insertion state, positional relationship between the lens-side claw portion 390 and the body-side claw portion 290 on the optical axis O is different from positional relationship at the insertion position. FIG. 12 and FIGS. 13A, 13B and 13C are schematic diagrams illustrating positional relationship between the body-side claw portion 290 of the camera body 2 and the lens-side claw portion 390 of the interchangeable lens 3, and are diagrams for making a state where the claw portions abut on each other understandable. Further, FIG. 12 and FIGS. 13A, 13B and 13C are diagrams of the body-side mount 210 and the lens-side mount 310, as seen from the subject side to the image sensor 270 side (seen in the +Z direction), and the lens-side mount 310 is horizontally inverted between FIG. 5 and FIG. 6. As an example of the erroneous insertion state, a state where the index of the interchangeable lens 3 and the index of the camera body 2 are displaced from the insertion position in the removing direction by 15 degrees is illustrated in FIG. 12. Further, states where the index of the interchangeable lens 3 and the index of the camera body 2 are displaced from the insertion position at intervals of 90 are illustrated in FIG. 13A to FIG. 13C.

FIG. 12 illustrates a state where the indexes are displaced from the insertion position in the removing direction by 15 degrees (first erroneous insertion state). As indicated with hatching in FIG. 12, because the lens-side claw portion 390 abuts on the body-side claw portion 290 at portions indicated with four reference signs γ1 to γ4, the lens-side claw portion 390 is not inserted into the body-side through portion 280. That is, in the first erroneous insertion state, by the lens-side claw portion 390 abutting on the body-side claw portion 290 at four portions, erroneous insertion is reliably prevented.

FIG. 13A is a diagram illustrating a state where the index of the interchangeable lens 3 and the index of the camera body 2 are displaced from the insertion position in the removing direction by approximately 90 degrees (second erroneous insertion state). FIG. 13B is a diagram illustrating a third erroneous insertion state where the index of the interchangeable lens 3 and the index of the camera body 2 are displaced from the insertion position in the removing direction by approximately 180 degrees. FIG. 13C is a diagram illustrating a fourth erroneous insertion state where the index of the interchangeable lens 3 and the index of the camera body 2 are displaced from the insertion position in the removing direction by approximately 270 degrees.

As illustrated in FIG. 13A, in a case of the second erroneous insertion state, because the third lens-side claw portion 390c abuts on the first body-side claw portion 290a at a portion indicated with a reference sign γ5, and abuts on the second body-side claw portion 290b at a portion indicated with γ7, the third lens-side claw portion 390c cannot be inserted into the second body-side through portion 280b. Further, because the first lens-side claw portion 390a abuts on the fourth body-side claw portion 290d at a portion indicated with a reference sign γ6, the first lens-side claw portion 390a cannot be inserted into the fourth body-side through portion 280d. In this manner, in the second erroneous insertion state, by the lens-side claw portion 390 abutting on the body-side claw portion 290 at three portions, erroneous insertion is prevented.

As illustrated in FIG. 13B, in a case of the third erroneous insertion state, because the fourth lens-side claw portion 390d abuts on the first body-side claw portion 290a at a portion indicated with a reference sign γ8, the fourth lens-side claw portion 390d cannot be inserted into the second body-side through portion 280b. Further, because the first lens-side claw portion 390a abuts on the third body-side claw portion 290c at a portion indicated with a reference sign γ9, the first lens-side claw portion 390a cannot be inserted into the first body-side through portion 280a. In this manner, in the third erroneous insertion state, by the lens-side claw portion 390 abutting on the body-side claw portion 290 at two portions, erroneous insertion is prevented.

As illustrated in FIG. 13C, in a case of the fourth erroneous insertion state, because the first lens-side claw portion 390a abuts on the first body-side claw portion 290a at a portion indicated with a reference sign γ10 and abuts on the second body-side claw portion 290b at a portion indicated with γ11, the first lens-side claw portion 390a cannot be inserted into the second body-side through portion 280b. Further, because the third lens-side claw portion 390c abuts on the third body-side claw portion 290c at a portion indicated with a reference sign γ12, the third lens-side claw portion 390c cannot be inserted into the fourth body-side through portion 280d. In this manner, in the fourth erroneous insertion state, by the lens-side claw portion 390 abutting on the body-side claw portion 290 at three portions, erroneous insertion is prevented.

(1) As described above, in the erroneous insertion states other than the insertion state where the interchangeable lens 3 is in a insertion position, by the lens-side claw portion 390 abutting on the body-side claw portion 290 at at least two portions, the lens-side claw portion 390 is prohibited from being inserted into the body-side through portion 280 at positions other than the insertion position. Therefore, even if it is tried to attach the interchangeable lens 3 to the camera body 2 at the erroneous insertion positions, by the claw portions abutting on each other at at least two portions, erroneous insertion is reliably prevented.

(2) Further, in the first erroneous insertion state to the fourth erroneous insertion state, one of two or more abutment positions is located above the upper side of the image sensor 270. That is, at the erroneous insertion positions, by one of the first lens-side claw portion 390a to the third lens-side claw portion 390c abutting on an end portion of a leading side of the first body-side claw portion 290a in the attaching direction 44, insertion of the first lens-side claw portion 390a, the third lens-side claw portion 390c and the forth lens-side claw portion 390d other than the second lens-side claw portion 390b into the second body-side through portion 280b is prevented.

(3) As mentioned above, the body-side terminal holding unit 220 is disposed within the opening 212 of the body-side mount 210 and above the upper side of the image sensor 270. The first body-side claw portion 290a is located above the body-side terminal holding unit 220, and a length of the first body-side claw portion 290a in the circumferential direction is the longest among the four body-side claw portions 290. Further, the second body-side through portion 280b is located above the body-side terminal holding unit 220, and the second body-side through portion 280b is the shortest among the four body-side through portions 280. Therefore, only the second lens-side claw portion 390b is capable of being inserted into the second body-side through portion 280b at a proper insertion position, and other first lens-side claw portion 390a to the third lens-side claw portion 390c are not erroneously inserted into the second body-side through portion 280b.

Further, even if the first lens-side claw portion 390a to the third lens-side claw portion 390c tilt (tilt in a direction intersecting with the optical axis O direction), the first lens-side claw portion 390a to the third lens-side claw portion 390c do not go into the second body-side through portion 280b.

By this means, the lens-side claw portions 390a to 390c are prevented from colliding with the body-side terminal holding unit 220 and damaging the body-side terminals in the erroneous insertion states.

(4) Further, while erroneous insertion of the lens-side claw portions 390 is prevented by the first body-side claw portion 290a abutting on one of the lens-side claw portions 390 in the erroneous insertion states, because the length of the first body-side claw portion 290a in the circumferential direction is the longest among the four body-side claw portions 290 and the first body-side claw portion 290a has high rigidity, it is possible to lower a possibility that the first body-side claw portion 290a is broken upon erroneous insertion.

(5) Further, in the second to the fourth erroneous insertion states, at least one of the abutment positions is located at a position opposite the body-side terminal holding unit 220 in relation to the optical axis O. That is, one of the abutment positions is located near the body-side terminal holding unit 220 and above the second body-side line B2 (see FIG. 2) which passes through the optical axis O, and another one of the abutment positions is located below the second body-side line B2 which passes through the optical axis O. Therefore, while only there are two or three abutment positions in the second to the fourth erroneous insertion states, because the claw portions respectively abut above and below the second body-side line B2 which passes through the optical axis O, it is possible to lower a possibility of erroneous insertion.

(6) Further, in the first to fourth erroneous insertion states, one of the two or more abutment positions is located on an outer periphery side of the lens-side terminal holding unit 320. That is, in the erroneous insertion positions, one of the first to fourth body-side claw portions 290a to 290d abuts on an end portion of a tip side of the first lens-side claw portion 390a in the attaching direction 44. Therefore, erroneous insertion of other second to fourth body-side claw portions 290b to 290d into the second lens-side through portion 380b is prevented. In short, the lens-side terminals are protected.

(7) As mentioned above, there is an end portion of a tip side of the first body-side claw portion 290a in the attaching direction 44, above the lens-side terminal holding unit 320. By this means, the first lens-side claw portion 390a is prevented from passing through the body-side through portions 280b to 280d other than the first body-side through portion 280a, colliding with the lens-side terminal holding unit 320 and damaging the lens-side terminals.

(8) Further, while erroneous insertion of the first lens-side claw portion 390a is prevented by the first lens-side claw portion 390a abutting on one of the body-side claw portions 290 in the erroneous insertion states, because a length of the first lens-side claw portion 390a in the circumferential direction is the second longest among the four lens-side claw portions 390 and the first lens-side claw portion 390a has relatively high rigidity, it is possible to lower a possibility that the first lens-side claw portion 390a is broken upon erroneous insertion.

(9) Here, as illustrated in FIG. 8, the second lens-side claw portion 390b passes through the second body-side through portion 280b to be disposed at the insertion position, and then faces the second body-side claw portion 290b at the attachment position. The angle α6 (FIG. 6) of the second lens-side claw portion 390b is smaller than the angle β2 (FIG. 3) of the second body-side through portion 280b. The angle β2 of the second body-side through portion 280b is smaller than the first rotating angle from the insertion position to the attachment position.

Therefore, by making the second lens-side claw portion 390b smaller than the first rotating angle, it is possible to make the second body-side through portion 280b smaller and prevent other lens-side claw portions 390 other than the second lens-side claw portion 390b from passing through the second body-side through portion 280b in the erroneous insertion state.

Particularly, in the second erroneous insertion state to the fourth erroneous insertion state where there are two or three portions at which the lens-side claw portion 390 abuts on the body-side claw portion 290, it is possible to prevent other lens-side claw portions 390a, 390c and 390d other than the second lens-side claw portion 390b from passing through the second body-side through portion 280b.

(10) Because the body-side terminal holding unit 220 is disposed on an inner diameter side of the second body-side through portion 280b, by the above-described other lens-side claw portions 390a, 390c and 390d being prevented from passing through, it is also possible to prevent the other lens-side claw portions 390 and the cylindrical portion 312 from colliding with the body-side terminal holding unit 220 and breaking the body-side terminals.

(11) Note that the angle α6 of the second lens-side claw portion 390b may be smaller than the angles α5, α7 and α8 of the first lens-side claw portion 390a, the third lens-side claw portion 390c and the fourth lens-side claw portion 390d. The angle β2 of the second body-side through portion 280b may be smaller than the angles α5, α7 and α8 of the above-described first lens-side claw portion 390a, the third lens-side claw portion 390c and the fourth lens-side claw portion 390d.

According to the above-described embodiment, it is possible to properly attach the interchangeable lens 3 to the camera body 2 in a usable manner. Particularly, because the four lens-side claw portions 390 are respectively pressed in the +Z direction from the flat springs 213 of the four body-side claw portions 290 once the interchangeable lens 3 is attached to the camera body 2, even in the case where one of the interchangeable lens 3 and the camera body 2 is subjected to impact, because there are respectively four projecting portions (the lens-side claw portion 390, the body-side claw portion 290), high impact resistance is provided.

Further, once the interchangeable lens 3 is attached to the camera body 2, it is possible to perform communication, power supply and control between the camera body 2 and the interchangeable lens 3 through respective terminals of the camera body 2 and the interchangeable lens 3, so that it is possible to properly use the camera system 1.

The four projecting portions of the interchangeable lens 3 are disposed on two lines intersecting with a line connecting the center of a contact point holding unit and the optical axis O at approximately 45 degrees on the optical axis O, come into contact with the four flat springs 213 disposed around the optical axis O at intervals of approximately 90 degrees and face the four projecting portions of the camera body 2. By this means, high impact resistance is provided both in the case where the camera system 1 is laterally or horizontally held and longitudinally held. Particularly, even if one of the interchangeable lens 3 and the camera body 2 is subjected to impact in a vertical direction, because two projecting portions are disposed each on the right side and on the left side of the lines (B1, L1 shown in FIGS. 5 and 7) connecting the center of the contact point holding unit and the optical axis O, it is possible to receive impact in the vertical direction at two or more projecting portions.

Referring to FIG. 2, the second body-side claw portion 290b and the fourth body-side claw portion 290d are disposed on the third body-side line B3, and the first body-side claw portion 290a and the third body-side claw portion 290c are disposed on the fourth body-side line B4. Here, the angle α4 of the fourth body-side claw portion 290d is the third largest among the four body-side claw portions 290, and the angle α2 of the second body-side claw portion 290b is the smallest (fourth largest) among the four body-side claw portions 290. Further, the angle α1 of the first body-side claw portion 290a is the largest among the four body-side claw portions 290, and the angle α3 of the third body-side claw portion 290c is the second largest among the four body-side claw portions.

Therefore, in the case where one of the interchangeable lens 3 and the camera body 2 is subjected to impact in a vertical direction, force applied to combination of the two projecting portions on the upper side (the first body-side claw portion 290a and the second body-side claw portion 290b) becomes substantially equal to force applied to combination of the two projecting portions on the lower side (the fourth body-side claw portion 290d and the third body-side claw portion 290c). Also in the case where one of the interchangeable lens 3 and the camera body 2 is subjected to impact in a horizontal direction, force applied to combination of the two projecting portions on the left side (the third body-side claw portion 290c and the second body-side claw portion 290b) becomes substantially equal to force applied to combination of the two projecting portions on the right side (the first body-side claw portion 290a and the fourth body-side claw portion 290d).

Referring to FIG. 5, the first lens-side claw portion 390a and the third lens-side claw portion 390c are disposed on the third lens-side line L3, and the second lens-side claw portion 390b and the fourth lens-side claw portion 390d are disposed on the fourth lens-side line L4. Here, the angle α8 of the fourth lens-side claw portion 390d is the third largest among the four lens-side claw portion 390, and the angle α6 of the second lens-side claw portion 390b is the smallest (the fourth largest) among the four lens-side claw portions 390. Further, the angle α5 of the first lens-side claw portion 390a is the second largest among the four lens-side claw portions, and the angle α7 of the third lens-side claw portion 390c is the largest among the four lens-side claw portions.

Therefore, in the case where one of the interchangeable lens 3 and the camera body 2 is subjected to impact in a vertical direction, force applied to combination of the two projecting portions on the upper side (the first lens-side claw portion 390a and the second lens-side claw portion 390b) becomes substantially equal to force applied to combination of the two projecting portions on the lower side (the fourth lens-side claw portion 390d and the third lens-side claw portion 390c). Also in the case where one of the interchangeable lens 3 and the camera body 2 is subjected to impact in a horizontal direction, force applied to combination of the two projecting portions on the left side (the first lens-side claw portion 390a and the fourth lens-side claw portion 390d) becomes substantially equal to force applied to combination of the two projecting portions on the right side (the third lens-side claw portion 390c and the second lens-side claw portion 390b).

Further, in the present embodiment, the angle of the third lens-side claw portion 390c is larger among the first lens-side claw portion 390a and the third lens-side claw portion 390c disposed on the third lens-side line L3, and the angle of the fourth lens-side claw portion 390d is larger among the second lens-side claw portion 390b and the fourth lens-side claw portion 390d disposed on the fourth lens-side line L4. That is, the two lens-side claw portions 390 on the lower side of the second lens-side line L2 (extending in a horizontal direction) are larger among the two lens-side claw portions 390 facing across the optical axis O. Therefore, it is possible to receive impact received on the interchangeable lens 3 from a lower direction with a large area of the two lens-side claw portions 390 with the large angle on the lower side of the second lens-side line L2 in a state where the camera system is horizontally held. Further, in the case where the interchangeable lens 3 is subjected to impact from a lower direction in a state where the camera system is horizontally held, the lens-side claw portions 390 on the lower side of the second lens-side line L2 are subjected to impact in a direction (−Z direction) closer to the body-side claw portion 290. Here, the flat spring 213 presses the lens-side claw portion 390 in a direction (+Z direction) away from the body-side claw portion 290. Therefore, even if the interchangeable lens 3 is subjected to impact from a lower direction in a state where the camera system is horizontally held, because the lens-side claw portions 390 on the lower side of the second lens-side line L2 can absorb impact with a large area and also with urging force of the flat springs 213 of the body-side claw portions 290 which face each other, high impact resistance is provided.

The lens-side terminal holding unit 320 is disposed above the image sensor 270 in a state where the interchangeable lens 3 is attached to the camera body 2. Because sunlight incident on the interchangeable lens 3 is incident on a lower side on an exit side of the interchangeable lens 3 in a state where the camera system 1 is horizontally held. In this situation, while ghost is likely to occur on the lower side of the image sensor 270, because, in the present embodiment, the lens-side terminal holding unit 320 is disposed not below but above the image sensor 270, it is possible to suppress ghost.

The four flat springs 213 are disposed around the optical axis O at intervals of approximately 90 degrees. Therefore, at least two flat springs 213 among the four flat springs 213 come into contact with the two lens-side claw portions 390 across the optical axis O, and the two lens-side claw portions 390 are pressed in the +Z direction. In the present embodiment, the interchangeable lens 3 includes four lens-side claw portions 390, even in the case where one lens-side claw portion 390 among the four lens-side claw portions 390 of the interchangeable lens 3 is broken, because at least two lens-side claw portions 390 are disposed at positions facing each other across the optical axis O, the lens-side claw portion 390 is pressed with the two flat springs 213 disposed at positions facing each other across the optical axis O. Therefore, it is possible to provide the camera system 1 in which the interchangeable lens 3 can be attached to the camera body 2 in a usable manner even if the lens-side claw portions 390 of the interchangeable lens 3 are broken and the number of lens-side claw portions 390 becomes insufficient.

Further, because the flat spring 213 is located on the line B5 (FIG. 4), it is possible to strongly press the lens-side terminals near the line B5 to the body-side terminals.

It is also possible to make the following modifications and also possible to combine one or a plurality of modified examples with the above-described embodiment.

Modified Examples

It is also possible to employ a configuration where one of the four lens-side claw portions 390 is removed, and three lens-side claw portions are provided. Because the flat springs 213 of the camera body 2 are disposed around the optical axis O at intervals of 90 degrees even if there are three lens-side claw portions, it is possible to attach the interchangeable lens 3 in a usable manner by the lens-side claw portions being pressed from at least three flat springs 213.

It is also possible to employ a configuration where two lens-side claw portions 390 which faces each other across the optical axis O are removed among the four lens-side claw portions 390, and two lens-side claw portions which face each other across the optical axis O are provided. Even if there are two lens-side claw portions, because the lens-side claw portions are disposed to face each other across the optical axis O and the flat springs of the camera body 2 are disposed around the optical axis at intervals of 90 degrees, it is possible to attach the interchangeable lens 3 in a usable manner by the lens-side claw portions being pressed from at least the flat springs 213 facing each other across the optical axis O.

Note that, in the case where a configuration is employed where two lens-side claw portions facing each other across the optical axis O are provided, it is preferable that one of the two lens-side claw portions is disposed at a position close to the center of the lens-side terminal holding unit 320. By the lens-side claw portion being disposed at a position close to the center of the lens-side terminal holding unit 320 and brought into contact with the flat spring 213, it is possible to properly use the camera system 1 while bringing the lens-side terminals contact with the body-side terminals.

A material of the lens-side mount 310 is not particularly limited, and may be a metal or a resin. Further, an end portion of the lens-side mount 310 (such as an end portion of an outer periphery side of the lens-side claw portion 390, an end portion of the lens-side claw portion 390 in a circumferential direction, and an end portion of the cylindrical portion 312 in the optical axis O direction) may be formed such that at least part is sloped. An end portion of the lens-side mount 310 does not have to be sloped and may be partially stepped.

A shape of the lens-side terminal holding unit 320 is not particularly limited, and can be changed as appropriate. Particularly, by causing the end portion of the lens-side terminal holding unit 320 in the circumferential direction to be sloped, it is possible to smoothly bring the lens-side terminal holding unit 320 into contact with the body-side terminal holding unit 220 while the interchangeable lens 3 is rotated from the insertion position to the attachment position.

Further, while the lens-side terminal holding unit 320 includes a plurality of lens-side terminals disposed in an arc shape, the positions of the lens-side terminals may be displaced as long as the lens-side terminals come into contact with the body-side terminals once the interchangeable lens 3 is attached to the camera body 2.

A central position and a length of the lens-side claw portion 390 in the circumferential direction can be changed as appropriate within a range where the lens-side claw portion 390 can be pressed from the flat spring 213 at the attachment position. The central position of the lens-side claw portion 390 in the circumferential direction and the central position of the urged portion in the circumferential direction may be located at different positions. That is, a position where the lens-side claw portion 390 is pressed from the central position of the flat spring 213 in the circumferential direction may be different from the central position of the lens-side claw portion 390 in the circumferential direction. In a similar manner, the central position of the lens-side claw portion 390 in the circumferential direction does not have to coincide with the central position of the body-side claw portion 290 in the circumferential direction at the attachment position. Further, the length of the lens-side claw portion 390 in the circumferential direction does not have to be the same as the length of the corresponding body-side claw portion 290 in the circumferential direction.

Note that, while, in the present embodiment, the interchangeable lens 3 of the camera system 1 has been described as an example of the accessory, the accessory is not limited to the interchangeable lens 3. For example, a tele converter, a wide converter, a close-up ring, or the like, which is attached between the camera body 2 and the interchangeable lens 3, and which changes a focal length of the interchangeable lens 3 may be used. Alternatively, it is also possible to apply the present invention to a mount adapter, or the like, which enables an accessory including the interchangeable lens 3 conforming to mount standards other than the mount standards of the camera body 2 to be able to be attached to the above-mentioned camera body 2. That is, the present invention can be similarly applied to any accessory which is used by being attached to the mount of the camera body 2. In this case, the lens-side claw portion, the lens-side terminal, or the like, respectively correspond to an accessory side projecting portion, an accessory side terminal, or the like, of the accessory.

While, in the above-described embodiment, the accessory which can be removably attached to the camera body 2 is used, the above-described camera body 2 may be a mount adapter which enables the interchangeable lens 3 conforming to the above-mentioned mount standards to be attached to a camera body which conforms to mount standards different from the above-mentioned mount standards, and it is also possible to employ a configuration where the above-mentioned accessory can be attached to the mount adapter.

While, various embodiments and modified examples have been described above, the present invention is not limited to these contents. Other aspects which can be considered within a scope of the technical idea of the present invention are incorporated into the scope of the present invention.

The invention claimed is:

1. An accessory to be removably attached to a camera body including:
    an image sensor which has a rectangular shape having an upper side, a lower side, a right side and a left side in a case where the camera body is horizontally held, the image sensor receiving incident subject light centering around an optical axis;
    a body-side terminal group including a plurality of body-side terminals disposed above the upper side of the image sensor;
    a body-side mount disposed outside the image sensor and the body-side terminal group, the body-side mount being ring shape centering around the optical axis; and
    a plurality of body-side projecting portions projecting from the body-side mount in an inner diameter direction,
    the accessory comprising:
    an accessory-side mount being ring-shaped centering around the optical axis and being configured to be in contact with the body-side mount;
    a cylindrical portion extending in the optical axis direction from an inner peripheral edge portion of the accessory-side mount;
    an accessory-side terminal group disposed inside the cylindrical portion, the accessory-side terminal group including a plurality of accessory-side terminals configured to be in contact with the body-side terminals upon attachment to the camera body;

a first accessory-side projecting portion projecting from the cylindrical portion in an outer periphery direction of the accessory-side mount and extending in a circumferential direction around the optical axis;

a second accessory-side projecting portion projecting from the cylindrical portion in the outer periphery direction of the accessory-side mount and extending in the circumferential direction around the optical axis;

a third accessory-side projecting portion projecting from the cylindrical portion in the outer periphery direction of the accessory-side mount and extending in the circumferential direction around the optical axis; and a fourth accessory-side projecting portion projecting from the cylindrical portion in the outer periphery direction of the accessory-side mount and extending in the circumferential direction around the optical axis, wherein:

the first accessory-side projecting portion and the third accessory-side projecting portion are disposed on a third accessory-side line extending through the optical axis and intersecting at the optical axis with a first accessory-side line at an angle of approximately 45 degrees, the first accessory-side line passing through the optical axis and a central portion between terminals each arranged at opposite ends of the accessory-side terminal group;

the second accessory-side projecting portion and the fourth accessory-side projecting portion are disposed on a fourth accessory-side line orthogonal to the third accessory-side line at the optical axis;

the first accessory-side projecting portion, the second accessory-side projecting portion, the third accessory-side projecting portion and the fourth accessory-side projecting portion extend in the circumferential direction around the optical axis; and at least one of a first center angle formed by a line connecting one end of the first accessory-side projecting portion in the circumferential direction and the optical axis and a line connecting the other end of the first accessory-side projecting portion in the circumferential direction and the optical axis; a second center angle formed by a line connecting one end of the second accessory-side projecting portion in the circumferential direction and the optical axis and a line connecting the other end of the second accessory-side projecting portion in the circumferential direction and the optical axis; a third center angle formed by a line connecting one end of the third accessory-side projecting portion in the circumferential direction and the optical axis and a line connecting the other end of the third accessory-side projecting portion in the circumferential direction and the optical axis, and a fourth center angle formed by a line connecting one end of the fourth accessory-side projecting portion in the circumferential direction and the optical axis and a line connecting the other end of the fourth accessory-side projecting portion in the circumferential direction and the optical axis is different from the other center angles.

2. The accessory according to claim 1, wherein:
at least one of a center of the first accessory-side projecting portion in the circumferential direction and a center of the third accessory-side projecting portion in the circumferential direction is disposed at a position different from a position on the third accessory-side line.

3. The accessory according to claim 1, wherein:
at least one of a center of the second accessory-side projecting portion in the circumferential direction and a center of the fourth accessory-side projecting portion in the circumferential direction is disposed at a position different from a position on the fourth accessory-side line.

4. The accessory according to claim 1, wherein:
the first accessory-side projecting portion, the second accessory-side projecting portion, the third accessory-side projecting portion and the fourth accessory-side projecting portion are respectively disposed in four regions divided by the first accessory-side line and a second accessory-side line orthogonal to the first accessory-side line at the optical axis.

5. The accessory according to claim 1, wherein:
the third center angle is larger than the first center angle;
the first center angle is larger than the fourth center angle; and
the fourth center angle is larger than the second center angle.

6. The accessory according to claim 1, wherein:
the accessory is attachable to the camera body by being rotated by a first angle in a first direction in a plane which is substantially orthogonal to the optical axis at a predetermined position on the optical axis from an insertion position where the first accessory-side projecting portion to the fourth accessory-side projecting portion are inserted between the respectively corresponding body-side projecting portions projecting from the body-side mount in an inner diameter direction, to an attachment position where the first accessory-side projecting portion to the fourth accessory-side projecting portion face the respectively corresponding body-side projecting portions.

7. The accessory according to claim 6, wherein:
the first accessory-side projecting portion, the second accessory-side projecting portion, the third accessory-side projecting portion and the fourth accessory-side projecting portion are arranged so that, at a position different from the insertion position in the circumferential direction around the optical axis, at least two among the first accessory-side projecting portion, the second accessory-side projecting portion, the third accessory-side projecting portion and the fourth accessory-side projecting portion abut with at least two among the plurality of the body-side projecting portions.

8. The accessory according to claim 6, wherein:
the first accessory-side projecting portion, the second accessory-side projecting portion, the third accessory-side projecting portion and the fourth accessory-side projecting portion are arranged so that, at a position different from the insertion position in the circumferential direction around the optical axis, one of the first accessory-side projecting portion, the second accessory-side projecting portion, the third accessory-side projecting portion and the fourth accessory-side projecting portion abuts the body-side projecting portion located in the circumferential direction of the body-side terminal group.

9. The accessory according to claim 6, wherein:
the first accessory-side projecting portion, the second accessory-side projecting portion, the third accessory-side projecting portion and the fourth accessory-side projecting portion are arranged so that, at a position different from the insertion position in the circumferential direction around the optical axis, the first accessory-side projecting portion which is closest to a center of the accessory-side terminal group abuts at least one of the plurality of body-side projecting portions.

10. The accessory according to claim 6, wherein:
at least one of the first center angle, the second center angle, the third center angle and the fourth center angle is smaller than the first angle.

11. The accessory according to claim 1, wherein:
the accessory is an interchangeable lens.

12. An accessory to be removably attached to a camera body including a body-side mount and body-side terminals, the accessory comprising:
an accessory-side mount being ring-shaped centering around an optical axis and being configured to be in contact with the body-side mount;
a cylindrical portion extending in the optical axis direction from an inner peripheral edge portion of the accessory-side mount;
an accessory-side terminal group disposed inside the cylindrical portion, the accessory-side terminal group including a plurality of accessory-side terminals configured to be in contact with the body-side terminals upon attachment to the camera body;
a first accessory-side projecting portion projecting from the cylindrical portion in an outer periphery direction of the accessory-side mount and extending in a circumferential direction around the optical axis;
a second accessory-side projecting portion projecting from the cylindrical portion in the outer periphery direction of the accessory-side mount and extending in the circumferential direction around the optical axis;
a third accessory-side projecting portion projecting from the cylindrical portion in the outer periphery direction of the accessory-side mount and extending in the circumferential direction around the optical axis; and
a fourth accessory-side projecting portion projecting from the cylindrical portion in the outer periphery direction of the accessory-side mount and extending in the circumferential direction around the optical axis, wherein
the first accessory-side projecting portion and the third accessory-side projecting portion are disposed on a third accessory-side line extending through the optical axis and intersecting at the optical axis with a first accessory-side line at an angle of approximately 45 degrees, the first accessory-side line passing through the optical axis and a central portion between terminals each arranged at opposite ends of the accessory-side terminal group;
the second accessory-side projecting portion and the fourth accessory-side projecting portion are disposed on a fourth accessory-side line orthogonal to the third accessory-side line at the optical axis;
the first accessory-side projecting portion, the second accessory-side projecting portion, the third accessory-side projecting portion and the fourth accessory-side projecting portion extend in the circumferential direction around the optical axis; and
at least one of a first center angle formed by a line connecting one end of the first accessory-side projecting portion in the circumferential direction and the optical axis and a line connecting the other end of the first accessory-side projecting portion in the circumferential direction and the optical axis; a second center angle formed by a line connecting one end of the second accessory-side projecting portion in the circumferential direction and the optical axis and a line connecting the other end of the second accessory-side projecting portion in the circumferential direction and the optical axis; a third center angle formed by a line connecting one end of the third accessory-side projecting portion in the circumferential direction and the optical axis and a line connecting the other end of the third accessory-side projecting portion in the circumferential direction and the optical axis, and a fourth center angle formed by a line connecting one end of the fourth accessory-side projecting portion in the circumferential direction and the optical axis and a line connecting the other end of the fourth accessory-side projecting portion in the circumferential direction and the optical axis is different from the other center angles.

13. The accessory according to claim 12, wherein:
the accessory-side terminal group are configured to make contact with the body-side terminals arranged in an arc shape above an upper side of an image sensor which has a rectangular shape having the upper side, a lower side, a right side and a left side in a case where the camera body is horizontally held, the image sensor receiving incident subject light centering around the optical axis.

14. The accessory according to claim 12, wherein:
the accessory is an interchangeable lens.

15. The accessory according to claim 12, wherein:
the third center angle is larger than the first center angle;
the first center angle is larger than the fourth center angle; and
the fourth center angle is larger than the second center angle.

16. The accessory according to claim 12, wherein:
the accessory is attachable to the camera body by being rotated by a first angle in a first direction in a plane which is substantially orthogonal to the optical axis at a predetermined position on the optical axis from an insertion position where the first accessory-side projecting portion to the fourth accessory-side projecting portion are inserted between the respectively corresponding body-side projecting portions projecting from the body-side mount in an inner diameter direction, to an attachment position where the first accessory-side projecting portion to the fourth accessory-side projecting portion face the respectively corresponding body-side projecting portions; and
at least one of the first center angle, the second center angle, the third center angle and the fourth center angle is smaller than the first angle.

17. An accessory to be removably attached to a camera body including:
an image sensor which has a rectangular shape having an upper side, a lower side, a right side and a left side in a case where the camera body is horizontally held, the image sensor receiving incident subject light centering around an optical axis;
a body-side terminal group including a plurality of body-side terminals disposed above the upper side of the image sensor;
a body-side mount disposed outside the image sensor and the body-side terminal group, the body-side mount being ring shape centering around the optical axis; and
a plurality of body-side projecting portions projecting from the body-side mount in an inner diameter direction, the accessory comprising:

an accessory-side mount being ring-shaped centering around the optical axis and being configured to be in contact with the body-side mount;

a cylindrical portion extending in the optical axis direction from an inner peripheral edge portion of the accessory-side mount;

an accessory-side terminal group disposed inside the cylindrical portion, the accessory-side terminal group including a plurality of accessory-side terminals configured to be in contact with the body-side terminals upon attachment to the camera body;

a first accessory-side projecting portion projecting from the cylindrical portion in an outer periphery direction of the accessory-side mount and extending in a circumferential direction around the optical axis;

a second accessory-side projecting portion projecting from the cylindrical portion in the outer periphery direction of the accessory-side mount and extending in the circumferential direction around the optical axis;

a third accessory-side projecting portion projecting from the cylindrical portion in the outer periphery direction of the accessory-side mount and extending in the circumferential direction around the optical axis; and a fourth accessory-side projecting portion projecting from the cylindrical portion in the outer periphery direction of the accessory-side mount and extending in the circumferential direction around the optical axis, wherein:

the first accessory-side projecting portion and the third accessory-side projecting portion are disposed on a third accessory-side line extending through the optical axis and intersecting at the optical axis with a first accessory-side line at an angle of approximately 45 degrees, the first accessory-side line passing through the optical axis and a central portion between terminals each arranged at opposite ends of the accessory-side terminal group;

the second accessory-side projecting portion and the fourth accessory-side projecting portion are disposed on a fourth accessory-side line orthogonal to the third accessory-side line at the optical axis;

the first accessory-side projecting portion, the second accessory-side projecting portion, the third accessory-side projecting portion and the fourth accessory-side projecting portion extend in the circumferential direction around the optical axis;

a third center angle formed by a line connecting one end of the third accessory-side projecting portion in the circumferential direction and the optical axis and a line connecting the other end of the third accessory-side projecting portion in the circumferential direction and the optical axis is larger than a first center angle formed by a line connecting one end of the first accessory-side projecting portion in the circumferential direction and the optical axis and a line connecting the other end of the first accessory-side projecting portion in the circumferential direction and the optical axis;

the first center angle is larger than a fourth center angle formed by a line connecting one end of the fourth accessory-side projecting portion in the circumferential direction and the optical axis and a line connecting the other end of the fourth accessory-side projecting portion in the circumferential direction and the optical axis; and the fourth center angle is larger than a second center angle formed by a line connecting one end of the second accessory-side projecting portion in the circumferential direction and the optical axis and a line connecting the other end of the second accessory-side projecting portion in the circumferential direction and the optical axis.

18. The accessory according to claim 17, wherein:

the accessory is attachable to the camera body by being rotated by a first angle in a first direction in a plane which is substantially orthogonal to the optical axis at a predetermined position on the optical axis from an insertion position where the first accessory-side projecting portion to the fourth accessory-side projecting portion are inserted between the respectively corresponding body-side projecting portions projecting from the body-side mount in an inner diameter direction, to an attachment position where the first accessory-side projecting portion to the fourth accessory-side projecting portion face the respectively corresponding body-side projecting portions; and at least one of the first center angle, the second center angle, the third center angle and the fourth center angle is smaller than the first angle.

19. The accessory according to claim 17, wherein:

the accessory is an interchangeable lens.

20. An accessory to be removably attached to a camera body including:

an image sensor which has a rectangular shape having an upper side, a lower side, a right side and a left side in a case where the camera body is horizontally held, the image sensor receiving incident subject light centering around an optical axis;

a body-side terminal group including a plurality of body-side terminals disposed above the upper side of the image sensor;

a body-side mount disposed outside the image sensor and the body-side terminal group, the body-side mount being ring shape centering around the optical axis; and a plurality of body-side projecting portions projecting from the body-side mount in an inner diameter direction, the accessory comprising:

an accessory-side mount being ring-shaped centering around the optical axis and being configured to be in contact with the body-side mount;

a cylindrical portion extending in the optical axis direction from an inner peripheral edge portion of the accessory-side mount;

an accessory-side terminal group disposed inside the cylindrical portion, the accessory-side terminal group including a plurality of accessory-side terminals configured to be in contact with the body-side terminals upon attachment to the camera body;

a first accessory-side projecting portion projecting from the cylindrical portion in an outer periphery direction of the accessory-side mount and extending in a circumferential direction around the optical axis;

a second accessory-side projecting portion projecting from the cylindrical portion in the outer periphery direction of the accessory-side mount and extending in the circumferential direction around the optical axis;

a third accessory-side projecting portion projecting from the cylindrical portion in the outer periphery direction of the accessory-side mount and extending in the circumferential direction around the optical axis; and a fourth accessory-side projecting portion projecting from the cylindrical portion in the outer periphery direction of the accessory-side mount and extending in the circumferential direction around the optical axis, wherein:

the first accessory-side projecting portion and the third accessory-side projecting portion are disposed on a third accessory-side line extending through the optical axis and intersecting at the optical axis with a first accessory-side line at an angle of approximately 45 degrees, the first accessory-side line passing through the optical axis and a central portion between terminals each arranged at opposite ends of the accessory-side terminal group;

the second accessory-side projecting portion and the fourth accessory-side projecting portion are disposed on a fourth accessory-side line orthogonal to the third accessory-side line at the optical axis;

the first accessory-side projecting portion, the second accessory-side projecting portion, the third accessory-side projecting portion and the fourth accessory-side projecting portion extend in the circumferential direction around the optical axis;

the accessory is attachable to the camera body by being rotated by a first angle in a first direction in a plane which is substantially orthogonal to the optical axis at a predetermined position on the optical axis from an insertion position where the first accessory-side projecting portion to the fourth accessory-side projecting portion are inserted between the respectively corresponding body-side projecting portions projecting from the body-side mount in an inner diameter direction, to an attachment position where the first accessory-side projecting portion to the fourth accessory-side projecting portion face the respectively corresponding body-side projecting portions; and a center angle of at least one of the first accessory-side projecting portion, the second accessory-side projecting portion, the third accessory-side projecting portion and the fourth accessory-side projecting portion is smaller than the first angle, the center angle being formed by a line connecting the optical axis and one end in the circumferential direction of a corresponding one of the first-fourth accessory-side projecting portions and by a line connecting the optical axis and the other end in the circumferential direction of the corresponding one of the first-fourth accessory-side projecting portions.

21. The accessory according to claim 20, wherein:
the accessory is an interchangeable lens.

* * * * *